US011423252B1

(12) United States Patent
Jagannathan et al.

(10) Patent No.: US 11,423,252 B1
(45) Date of Patent: Aug. 23, 2022

(54) OBJECT DATASET CREATION OR MODIFICATION USING LABELED ACTION-OBJECT VIDEOS

(71) Applicant: International Business Machines Corporation, Armonk, NY (US)

(72) Inventors: Anupama Jagannathan, Cedar Park, TX (US); Anne Elizabeth Gattiker, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/244,476

(22) Filed: Apr. 29, 2021

(51) Int. Cl.

| | |
|---|---|
| ***G06K 9/62*** | (2022.01) |
| ***G06F 40/205*** | (2020.01) |
| ***G06V 20/40*** | (2022.01) |
| ***G06V 10/44*** | (2022.01) |
| ***G06V 10/82*** | (2022.01) |

(Continued)

(52) U.S. Cl.
CPC ........... *G06K 9/623* (2013.01); *G06F 40/205* (2020.01); *G06K 9/6257* (2013.01); *G06V 10/255* (2022.01); *G06V 10/44* (2022.01); *G06V 10/62* (2022.01); *G06V 10/764* (2022.01); *G06V 10/82* (2022.01); *G06V 20/46* (2022.01)

(58) Field of Classification Search
None
See application file for complete search history.

(56) References Cited

U.S. PATENT DOCUMENTS 6,310,629 B1 10/2001 Muthusamy et al.
7,797,282 B1 * 9/2010 Kirshenbaum ......... G06F 16/35 707/681

(Continued)

FOREIGN PATENT DOCUMENTS

CN 108229445 A 6/2018
CN 108647591 A 10/2018

(Continued)

OTHER PUBLICATIONS

Diwala, Santosh K., Ali Farhadi, and Carlos Guestrin. "Learning everything about anything: Webly-supervised visual concept learning." Proceedings of the IEEE Conference on Computer Vision and Pattern Recognition. 2014. (Year: 2014).*

(Continued)

*Primary Examiner* — Emily C Terrell
*Assistant Examiner* — Nathan J Bloom
(74) *Attorney, Agent, or Firm* — Stephen J. Walder, Jr.; Jorge Maranto

(57) ABSTRACT

An object dataset creation or modification mechanism is provided for object dataset creation or modification using a labeled action-object video. For a plurality of frames of the labeled action-object video, an identification is made of a subset of frames where a bounding box object (BBO) exists. BBOs in the subset of frames where a BBO exists are pruned to identify sufficiently distinct BBOs thereby forming a set of pruned BBOs. For each pruned BBO in the set of pruned BBOs: an information addition score is determined; the information addition score is assessed; responsive to the information addition score being positively assessed, the pruned BBO is added to an object dataset; and, responsive to the information addition score being negatively assessed, the pruned BBO is discarded.

20 Claims, 8 Drawing Sheets

(51) Int. Cl.

| | |
|---|---|
| ***G06V 10/764*** | (2022.01) |
| ***G06V 10/20*** | (2022.01) |
| ***G06V 10/62*** | (2022.01) |

(56) References Cited

U.S. PATENT DOCUMENTS

| | | | | |
|---|---|---|---|---|
| 8,620,022 | B2 | 12/2013 | Jeong et al. | |
| 9,616,568 | B1 | 4/2017 | Russell | |
| 9,740,956 | B2 | 8/2017 | Chen et al. | |
| 10,121,076 | B2 | 11/2018 | Chakraborty et al. | |
| 10,121,256 | B2 | 11/2018 | Zhong et al. | |
| 10,198,818 | B2 | 2/2019 | Varadarajan et al. | |
| 2016/0005281 | A1* | 1/2016 | Laska | H04N 7/188 348/143 |
| 2016/0300121 | A1 | 10/2016 | Chertok et al. | |
| 2019/0022863 | A1 | 1/2019 | Kundu et al. | |
| 2019/0220525 | A1* | 7/2019 | Song | G06F 16/7837 |
| 2021/0287006 | A1* | 9/2021 | Feng | G06T 7/20 |
| 2021/0365687 | A1 | 11/2021 | Starson et al. | |
| 2022/0076424 | A1* | 3/2022 | Shin | G06T 7/162 |

FOREIGN PATENT DOCUMENTS

| | | | |
|---|---|---|---|
| CN | 108765450 | A | 11/2018 |
| CN | 109063723 | A | 12/2018 |
| CN | 109492581 | A | 3/2019 |
| CN | 110348312 | A | 10/2019 |
| CN | 111401205 | A | 7/2020 |
| WO | WO2017/201676 | A1 | 11/2017 |
| WO | WO2020/020472 | A1 | 1/2020 |
| WO | WO2020/020474 | A1 | 1/2020 |

OTHER PUBLICATIONS

Ye Y, Yang X, Tian Y. Discovering spatio-temporal action tubes. Journal of Visual Communication and Image Representation. Jan. 1, 2019;58:515-24. (Year: 2019).*

Sun, Yan, and Zheping Yan. "Image target detection algorithm compression and pruning based on neural network." Computer Science and Information Systems 18.2 (Jan. 2021): 499-516. (Year: 2021).*

International Search Report and Written Opinion dated Dec. 24, 2021 for International Application No. PCT/IB2021/058259, 9 pages.

List of IBM or Patent Applications Treated as Related (Appendix P), Apr. 29, 2020, 2 pages.

"WordNet | A Lexical Database for English", Princeton University "About WordNet." WordNet. Princeton University. 2010. https://wordnet.princeton.edu/, downloaded from the internet on Jan. 12, 20201, 4 pgs.

Carreira, Joao et al., "Quo Vadis, Action Recognition? A New Model and the Kinetics Dataset", IEEE Conference on Computer Vision and Pattern Recognition (CVPR), Jul. 2017, 10 pages.

Chao, Yu-Wei et al., "Learning to Detect Human-Object Interactions", 2018 IEEE Winter Conference on Applications of Computer Vision (WACV), Mar. 2018, 10 Pages.

Deng, Jia et al., "Imagenet: A large-scale hierarchical image database", 2009 IEEE Conference on Computer Vision and Pattern Recognition, Jun. 2009, 8 pages.

Fathi, Alireza et al., "Modeling Actions through State Changes", In Proceedings of the 2013 IEEE Conference on Computer Vision and Pattern Recognition (CVPR '13), Jun. 23, 2013-Jun. 28, 2013, 8 pages.

Filipovych, Roman et al., "Recognizing Primitive Interactions by Exploring Actor-Object States", In IEEE International Conference on Pattern Recognition (CVPR), Alaska, Jun. 2008, 7 pages.

Hariharan, Bharath et al., "Low-shot Visual Recognition by Shrinking and Hallucinating Features", ICCV 2017 : International Conference on Computer Vision, Oct. 22, 2017-Oct. 29, 2017, Venice, Italy, 10 pages.

He, Kaiming et al., "Deep residual learning for image recognition", In Proceedings of the IEEE conference on computer vision and pattern recognition, Jun. 2016, pp. 770-778.

Held, David et al., "Learning to Track at 100 FPS with Deep Regression Networks", The 14th European Conference on Computer Vision ECCV2016, Oct. 2016, 17 pages.

Lewis, J.P. , "Fast Template Matching", Vision Interface 95, Canadian Image Processing and Pattern Recognition Society, Quebec City, Canada, May 15-19, 1995, 4 pages.

Lin, Tsung-Yi et al., "Focal Loss for Dense Object Detection", 2017 IEEE International Conference on Computer Vision (ICCV), Oct. 2017, 9 pages.

Lin, Tsung-Yi et al., "Microsoft COCO: Common Objects in Context", ECCV: European Conference on Computer Vision, Oct. 2016, 15 pages.

Monfort, Matthew et al., "Moments in Time Dataset: one million videos for event understanding", IEEE Transactions on Pattern Analysis and Machine Intelligence, vol. 41, Dec. 4, 2019, 8 pages.

Ratner, Alexander et al., "Data Programming: Creating Large Training Sets, Quickly", Thirtieth Conference on Neural Information Processing Systems NeurIPS 2016, Dec. 2016, 27 pages.

Selvaraj, R. R. et al., "Grad-CAM: Visual Explanations from Deep Networks via Gradient-based Localization", In The IEEE International Conference on Computer Vision (ICCV), Oct. 2017, 9 pages.

Shi, Zhiyuan et al., "Weakly-Supervised Image Annotation and Segmentation with Objects and Attributes", Computing Research Repository (CoRR), Apr. 2017, 14 pages.

Szegedy, Christian et al., "Inception-v4, Inception-ResNet and the Impact of Residual Connections on Learning", Proceedings of the Thirty-First AAAI Conference on Artificial Intelligence (AAAI-17), Feb. 2017, 7 pages.

Yao, Benspeng et al., "Recognizing Human-Object Interactions in Still Images by Modeling the Mutual Context of Objects and Human Poses", IEEE Transactions on Pattern Analysis and Machine Intelligence, vol. 34, No. 9, Sep. 2012, pp. 1691-1703.

Zhou, Bolei et al., "Temporal Relational Reasoning in Videos", Proceedings of the European Conference on Computer Vision (ECCV), Sep. 2018, 16 pages.

List of IBM or Patent Applications Treated as Related (Appendix P), Feb. 10, 2022, 2 pages.

Jagannathan, Anupama et al., Pending U.S. Appl. No. 17/668,526, filed Feb. 10, 2022, titled "Action-Object Recognition in Cluttered Video Scenes Using Text", 43 pages.

Jagannathan, Anupama et al., Pending U.S. Appl. No. 17/062,896, filed Oct. 5, 2020, titled "Action-Object Recognition in Cluttered Video Scenes Using Text", 43 pages.

* cited by examiner

OBJECT DATASET CREATION OR MODIFICATION USING LABELED ACTION-OBJECT VIDEOS

BACKGROUND

The present application relates generally to an improved data processing apparatus and method and more specifically, to mechanisms for object dataset creation or modification using labeled action-object videos.

The process of training a machine learning (ML) model or a deep learning (DL) model involves providing an ML or DL algorithm (that is, the learning algorithm) with training data to learn from. The term "ML model" or "DL model" refers to the model artifact that is created by the training process. The training data must contain the correct answer, which is known as a target or target attribute. The learning algorithm finds patterns in the training data that map the input data attributes to the target (the answer that you want to predict) and it outputs an ML or DL model that captures these patterns.

SUMMARY

This summary is provided to introduce a selection of concepts in a simplified form that are further described herein in the Detailed Description. This summary is not intended to identify key factors or essential features of the claimed subject matter, nor is it intended to be used to limit the scope of the claimed subject matter.

In one illustrative embodiment, a method, in a data processing system comprising at least one processor and at least one memory, the at least one memory comprising instructions that are executed by the at least one processor to configure the at least one processor to implement an object dataset creation or modification mechanism for object dataset creation or modification using a labeled action-object video. For a plurality of frames of the labeled action-object video, the illustrative embodiment identifies a subset of frames where a bounding box object (BBO) exists. The illustrative embodiment prunes BBOs in the subset of frames where a BBO exists to identify sufficiently distinct BBOs thereby forming a set of pruned BBOs. For each pruned BBO in the set of pruned BBOs: the illustrative embodiment determines an information addition score; assesses the information addition score; adds the pruned BBO to an object dataset in response to the information addition score being positively assessed; and discards the pruned BBO in response to the information addition score being negatively assessed.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE DRAWINGS

The invention as well as a preferred mode of use and further objectives and advantages thereof, will best be understood by reference to the following detailed description of illustrative embodiments when read in conjunction with the accompanying drawings, wherein.

DETAILED DESCRIPTION

Figure 1:
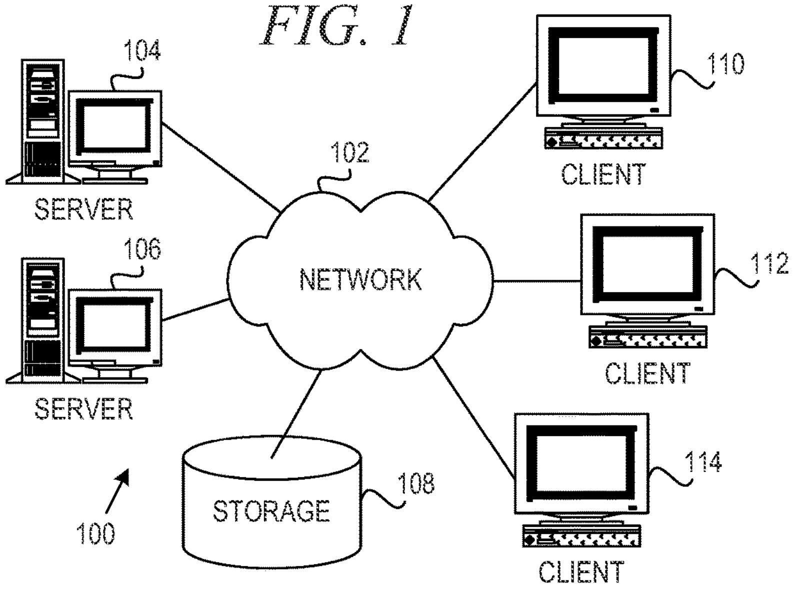
FIG. 1 is an example diagram of a distributed data processing system in which aspects of the illustrative embodiments may be implemented.

Deep learning has revolutionized computer vision. Supervised deep learning involves training complex neural network models using large labeled datasets.

Large labeled training datasets such as ImageNet®, Microsoft® Common Objects in Context (MS-COCO) and Moments in Time exist for object classification, object detection and action recognition respectively. Deep learning based classification models (hereafter also referred to as 'object classifiers') provide high accuracy for objects seen in existing large training sets, especially ImageNet®. However, the performance of such models is affected when applied to data whose feature distribution is different from the training data. While this problem is typically addressed by transfer learning or domain adaptation based techniques, each of these techniques require a significant amount of labeled training data to be successful. Another challenge with the current object datasets used in training deep learning models is that many of the datasets only have a few examples of objects in different states. Different states of an object typically arise when an object is acted on such as during 'open', 'close', 'cut', or the like.

Video based action recognition finds important applications such as in video compliance which deals with the task of determining if a video of a person carrying out an action on an object shows the person complying with an accompanying text instruction. A specific component of video compliance is recognizing the object being acted upon when that object is in a variety of states. The terms 'video compliance' and 'action compliance' are used interchangeably.

The illustrative embodiments provide mechanisms to create a new object dataset or modify an object dataset including objects identified in a set of frames of a video in altered states. The mechanisms ensure training examples considered for inclusion in the object dataset are sufficiently different from examples already included. In addition, the illustrative embodiments provide mechanisms to create object dataset categories that are especially useful for problems such as action compliance verification. In such a scenario, the dataset has sets of separate state categories for objects, such as separate categories for "box that is open" versus "box that is closed."

Before beginning the discussion of the various aspects of the illustrative embodiments, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on general purpose hardware, software instructions stored on a medium such that the instructions are readily executable by specialized or general purpose hardware, a procedure or method for executing the functions, or a combination of any of the above.

The present description and claims may make use of the terms "a," "at least one of," and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

Moreover, it should be appreciated that the use of the term "engine," if used herein with regard to describing embodiments and features of the invention, is not intended to be limiting of any particular implementation for accomplishing and/or performing the actions, steps, processes, etc., attributable to and/or performed by the engine. An engine may be, but is not limited to, software, hardware and/or firmware or any combination thereof that performs the specified functions including, but not limited to, any use of a general and/or specialized processor in combination with appropriate software loaded or stored in a machine readable memory and executed by the processor. Further, any name associated with a particular engine is, unless otherwise specified, for purposes of convenience of reference and not intended to be limiting to a specific implementation. Additionally, any functionality attributed to an engine may be equally performed by multiple engines, incorporated into and/or combined with the functionality of another engine of the same or different type, or distributed across one or more engines of various configurations.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

Figure 2:
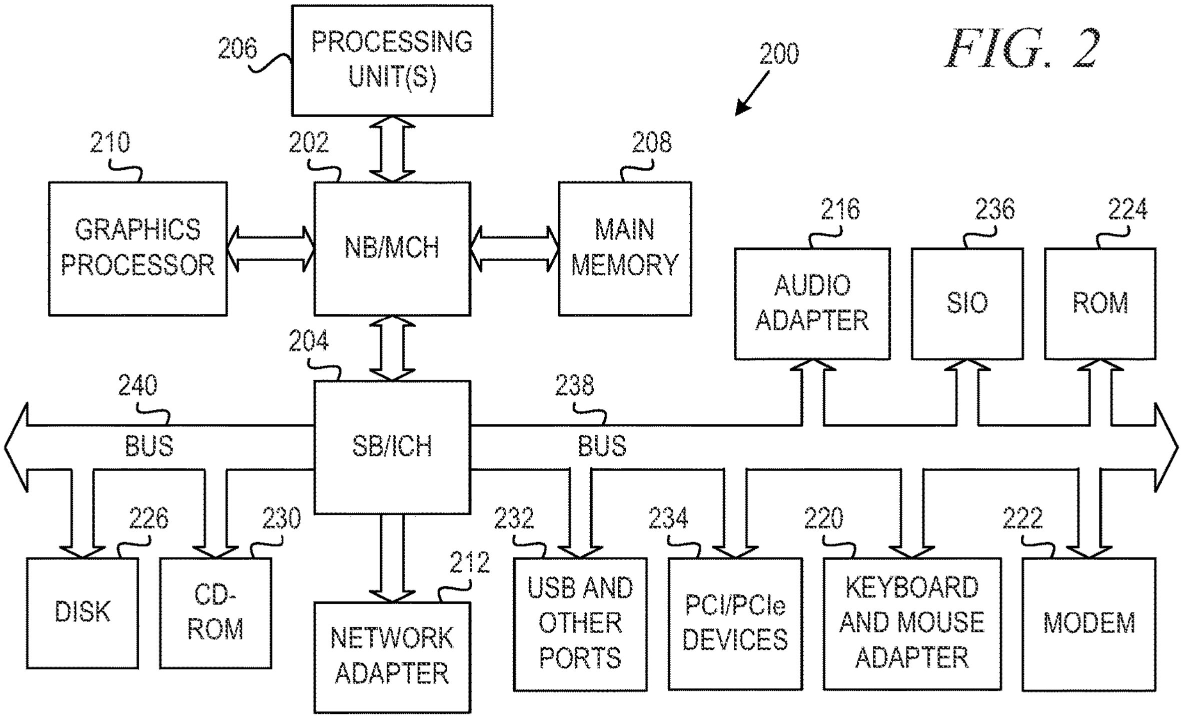
FIG. 2 is an example block diagram of a computing device in which aspects of the illustrative embodiments may be implemented.

Thus, the illustrative embodiments may be utilized in many different types of data processing environments. In order to provide a context for the description of the specific elements and functionality of the illustrative embodiments, FIGS. 1 and 2 are provided hereafter as example environments in which aspects of the illustrative embodiments may be implemented. It should be appreciated that FIGS. 1 and 2 are only examples and are not intended to assert or imply any limitation with regard to the environments in which aspects or embodiments of the present invention may be implemented. Many modifications to the depicted environments may be made without departing from the spirit and scope of the present invention.

FIG. 1 depicts a pictorial representation of an example distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

As shown in FIG. 1, one or more of the computing devices, e.g., server 104, may be specifically configured to implement an action-object interaction detection mechanism for recognizing action-object actions in cluttered video scenes by leveraging existing datasets. The configuring of the computing device may comprise the providing of application specific hardware, firmware, or the like to facilitate the performance of the operations and generation of the outputs described herein with regard to the illustrative embodiments. The configuring of the computing device may also, or alternatively, comprise the providing of software applications stored in one or more storage devices and loaded into memory of a computing device, such as server 104, for causing one or more hardware processors of the computing device to execute the software applications that configure the processors to perform the operations and generate the outputs described herein with regard to the illustrative embodiments. Moreover, any combination of application specific hardware, firmware, software applications executed on hardware, or the like, may be used without departing from the spirit and scope of the illustrative embodiments.

It should be appreciated that once the computing device is configured in one of these ways, the computing device becomes a specialized computing device specifically configured to implement the mechanisms of the illustrative embodiments and is not a general purpose computing device. Moreover, as described hereafter, the implementation of the mechanisms of the illustrative embodiments improves the functionality of the computing device and provides an object dataset.

As noted above, the mechanisms of the illustrative embodiments utilize specifically configured computing devices, or data processing systems to perform the operations for creating or modifying an object dataset. These computing devices, or data processing systems, may comprise various hardware elements which are specifically configured, either through hardware configuration, software configuration, or a combination of hardware and software configuration, to implement one or more of the systems/subsystems described herein. FIG. 2 is a block diagram of just one example data processing system in which aspects of the illustrative embodiments may be implemented. Data processing system 200 is an example of a computer, such as server 104 in FIG. 1, in which computer usable code or instructions implementing the processes and aspects of the illustrative embodiments of the present invention may be located and/or executed so as to achieve the operation, output, and external effects of the illustrative embodiments as described herein.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows 10®. An object-oriented programming system, such as the Java™ programming system, may run in conjunction with the operating system and provides calls to the operating system from Java™ programs or applications executing on data processing system 200.

As a server, data processing system 200 may be, for example, an IBM eServer™ System p® computer system, Power™ processor based computer system, or the like, running the Advanced Interactive Executive (AIX®) operating system or the LINUX™ operating system. Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

As mentioned above, in some illustrative embodiments the mechanisms of the illustrative embodiments may be implemented as application specific hardware, firmware, or the like, application software stored in a storage device, such as HDD 226 and loaded into memory, such as main memory 208, for executed by one or more hardware processors, such as processing unit 206, or the like. As such, the computing device shown in FIG. 2 becomes specifically configured to implement the mechanisms of the illustrative embodiments and specifically configured to perform the operations and create or modify object datasets utilizing labeled action-object videos.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

Figure 3:
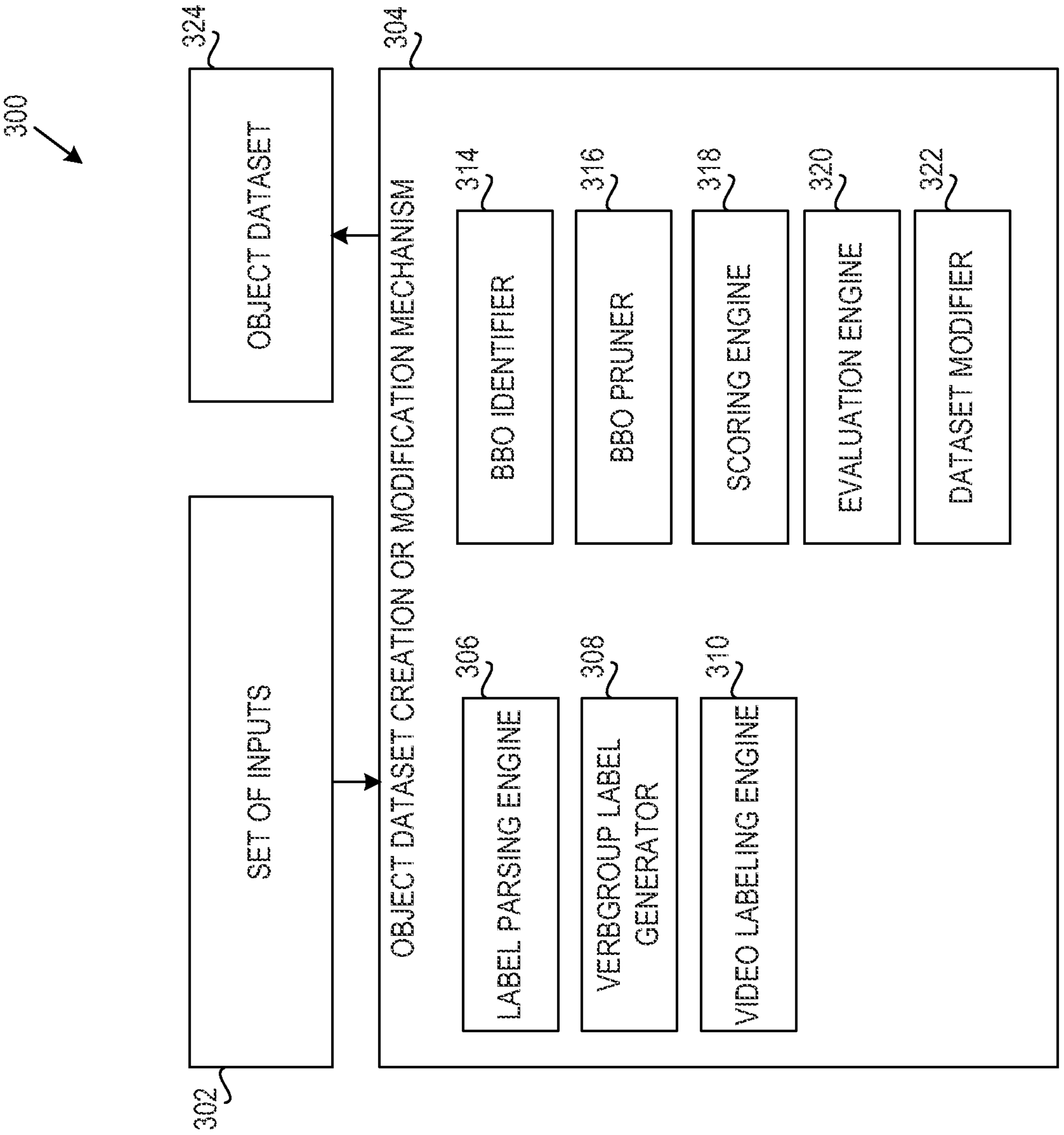
FIG. 3 depicts a functional block diagram of an object dataset creation or modification mechanism for creating a new object dataset or modifying an existing object dataset in accordance with an illustrative embodiment.

FIG. 3 depicts a functional block diagram of an object dataset creation or modification mechanism for creating a new object dataset or modifying an existing object dataset in accordance with an illustrative embodiment. In the illustrative embodiments, the creation or modification of the object dataset may be performed in numerous different ways. For example, in one embodiment, an object dataset may be created for the purpose of transfer learning. If the dataset is large enough it could be used as a stand-alone dataset to train a neural network (e.g., to train a neural network that is randomly initialized), instead of or in addition to being used for transfer learning. In another embodiment, an object dataset may be created for inclusion in existing larger object datasets. In yet another embodiment, the modification of an object dataset may be performed by adding or replacing object categories, which may be especially useful for action compliance verification. The terms 'object dataset' and 'object classification dataset' are used interchangeably hereafter.

Data processing system 300 comprises a set of inputs 302 and object dataset creation or modification mechanism 304. The set of inputs 302 comprises a set of action-object videos with corresponding labels, where every action-object video is associated with a correct label that describes an action being performed on an object in the associated video. For embodiments that modify an existing object dataset, the set of inputs 302 further comprises the existing object dataset. Hereafter, the 'action' in the label may also be referred to as a 'verb' that describes the action being performed. Object dataset creation or modification mechanism 304 comprises, label parsing engine 306, VerbGroup label generator 308, video labeling engine 310, bounding box object (BBO) identifier 314, BBO pruner 316, scoring engine 318, evaluation engine 320, and dataset modifier 322.

Preliminarily, label parsing engine 306 parses each label associated with the set of inputs 302 in order to extract the object and the verb associated with the object. Label parsing engine 306 aggregates the extracted objects and associated verbs and produces (1) a list of all objects seen in the set of videos and (2) a list of all verbs associated with each object. Hereafter the list of verbs associated with each object is referred to as the object's consolidated list of verbs (OCLV). For example, if the set of input videos have labels "cut bag", "close bag", "stow bag", "carry bag", and "close drawer", then the outputs from the label parser are (1) a list of all objects namely {'bag', 'drawer'} and (2) an OCLV for each object. The OCLV for 'bag' is ['cut', 'close', 'stow', 'carry'] and the OCLV for 'drawer' is ['close']. In an embodiment label parsing engine 306 uses a lexical database to identify state-change verbs, such as 'open'. 'close', 'fill', 'empty' and 'cut' and only videos whose extracted verb is identified as a state-change verb are selected for further processing. In such an embodiment, a lexical database is included in the set of inputs 302. In other embodiments, no such video selection is performed and no lexical database is included in the set of inputs 302.

Next, VerbGroup label generator 308 groups the OCLV associated with each object into subgroups. In one embodiment, similarity-based subgroups are created based on a statistical measure of similarity between verbs in an encoded feature space. In one embodiment, such a similarity-based subgroup may be obtained by first encoding the verbs using word2vec and then by measuring a similarity between the underlying verbs by computing a distance metric such as Euclidean distance between the corresponding encoded vectors. Techniques such as clustering may be used to group the verbs into similarity-based subgroups. The intuition is that verbs that are distant in the encoded feature space may be likely to act on objects that are visually different from each other. For example, for verbs 'cut' and 'carry' that appear with the object 'bag' in the set of videos, the distance between the word2vec encoding of 'cut' and the word2vec encoding of 'carry' is relatively large. Due to this, VerbGroup label generator 308 would assign these verbs into different similarity-based subgroups. On the other hand, for verbs 'stow' and 'carry' that appear with the object 'bag' in the set of videos, the distance between the word2vec encoding of 'stow' and the work2vec encoding of 'carry' is relatively small. Due to this, VerbGroup label generator 308 would assign these verbs into the same similarity-based subgroup. Intuitively, the types of bags that one stows or carries may look like luggage, whereas the types of bags that one cuts may look like product packaging bags.

The output from VerbGroup label generator 308 is a verb-group list for each object. Hereafter the list of verb subgroups associated with each object is referred to as the object's verb-group list (OVGL). Every object is associated with its own OVGL. For example, in an embodiment where similarity-based subgrouping is performed and verbs are considered when creating comparison datasets and assuming a relatively strong similarity between 'stow' and 'carry' (e.g. measured as a close distance between the representations of the words in an encoded feature space) and a relatively weak similarity between both 'stow' and 'carry' with 'cut' and 'close' as well as a relatively weak similarity between 'cut' and 'close', if the set of input videos have labels "cut bag", "close bag", "stow bag", "carry bag" and "close drawer," then for the object "bag" the OVGL is: [['stow', 'carry'], ['cut'], ['close']]. Here, ['stow', 'carry'] indicates that these verbs are present in the same subgroup. The OVGL for the object "drawer" is: ['close'].

VerbGroup label generator 308 initializes an empty comparison dataset corresponding to each subgroup in every object's OVGL, hereafter referred to as OVG-CD. In other words, an empty OVG-CD is initialized for each combination of object and verb subgroup. Continuing with the example above, in an embodiment where similarity-based subgrouping is performed and verbs are considered when creating comparison datasets, if the set of input videos have labels "cut bag", "close bag", "stow bag", "carry bag" and "close drawer", then VerbGroup label generator 308 creates an empty OVG-CD for the object "bag" that corresponds to the verb subgroup ['stow', 'carry'], an empty OVG-CD for the object "bag" that corresponds to the verb subgroup ['cut'], an empty OVG-CD for the object "bag" that corresponds to the verb subgroup ['close'] and an empty OVG-CD for the object "drawer" that corresponds to the verb subgroup ['close'].

In another embodiment, similarity-based subgrouping may be skipped but verbs considered when determining comparison datasets. In that case, there is a subgroup for each verb in the object's OCLV and each subgroup contains the corresponding single verb. The OVGL for each object is a list of subgroups each containing a single verb. Moreover, for every object, VerbGroup label generator 308 initializes an empty OVG-CD for every verb associated with the object, i.e., for every verb in the object's OCLV.

In yet another embodiment, verbs are not considered when determining comparison datasets. In that case, VerbGroup label generator 308 creates a single verb subgroup for each object, where the verb subgroup contains all the verbs in the object's OCLV. The object's OVGL comprises the single verb subgroup. Moreover, VerbGroup label generator 308 initializes one empty OVG-CD associated with each object. That OVG-CD corresponds to all the verbs associated with the respective object, i.e., all the verbs in the object's OCLV. Continuing with the example labels above, in this embodiment, VerbGroup label generator 308 creates an OVGL for "bag" ['stow', 'carry', 'cut', 'close'], an OVGL for "drawer" ['close'], an empty OVG-CD for the object "bag" that corresponds to all verbs in the OVGL for "bag" and an empty OVG-CD for the object "drawer" that corresponds to all verbs in the OVGL for "drawer."

Video labeling engine 310 labels every action-object video and each frame within every action-object video with an 'object' label and a 'verb' label which are determined by label parsing engine 306 and a 'verb group for video' (VGV) label. The terms VGV label and verb subgroup label are used interchangeably. The video labeling engine 310 determines the VGV label for each video by choosing the verb subgroup that contains the video's verb among the verb subgroups in the OVGL for the object, where the OVGL for the object has been determined by the VerbGroup label generator 308. For example, in an embodiment where verbs are considered when determining comparison datasets and similarity-based verb subgrouping is not skipped, assuming the same example set of video labels above, for a video with input label "carry bag", the object label is "bag", the verb label is "carry", the OVGL is [['stow', 'carry'], ['cut'], ['close']] and the VGV label is ['stow', 'carry']. In another example, if the input label is "cut bag", the object label is "bag", the verb label is "cut", the OVGL is [['stow', 'carry'], ['cut'], ['close']] and the VGV label is ['cut']. In an embodiment where similarity-based verb subgrouping is skipped but verbs are considered when determining comparison datasets, the VGV label for the video would be the verb label associated with the video. In an embodiment where verbs are not considered when determining comparison datasets, the VGV label for the video would contain all the verbs associated with the video's object, i.e., it would be the object's OCLV. Video labeling engine 310 labels the frames of each video with the video's object, verb and VGV labels.

In an embodiment, label parsing engine 306 identifies pairs of verbs that are opposite in meaning, such as 'fill' and 'empty', for example using a lexical database that lists opposite verbs, or identifying such pairs manually. In the embodiment, in the video processing steps, videos associated with one of the verbs, say verb2, are processed in reverse. I.e., before processing the video frames, the order of the frames in the video are reversed. Call the verbs in the pair verb1 and verb2. In an embodiment, optionally videos associated with verb1 and verb2 may be given combined-verb labels, such as verb1-verb2, for example videos associated with 'fill' or 'empty' would be given new labels 'fill-empty.' The video labeling engine 310 assigns a verb label to the video that is the combined-verb label and the VGV label is the verb subgroup that includes the combined-verb label. In an embodiment where similarity-based verb subgrouping is performed, VerbGroup label generator 308 could, for example, choose one of verb1 or verb2 to use in calculations of similarity to other verbs when creating similarity-based verb subgroups. Alternatively, VerbGroup label generator 308 could, for example, use each of verb1 and verb2 in each verb similarity calculation and average the verb1 and verb2 similarity scores against the other verbs in the OCLV. Any subgroup created based on such scores would contain the combined-verb label.

Figure 5:
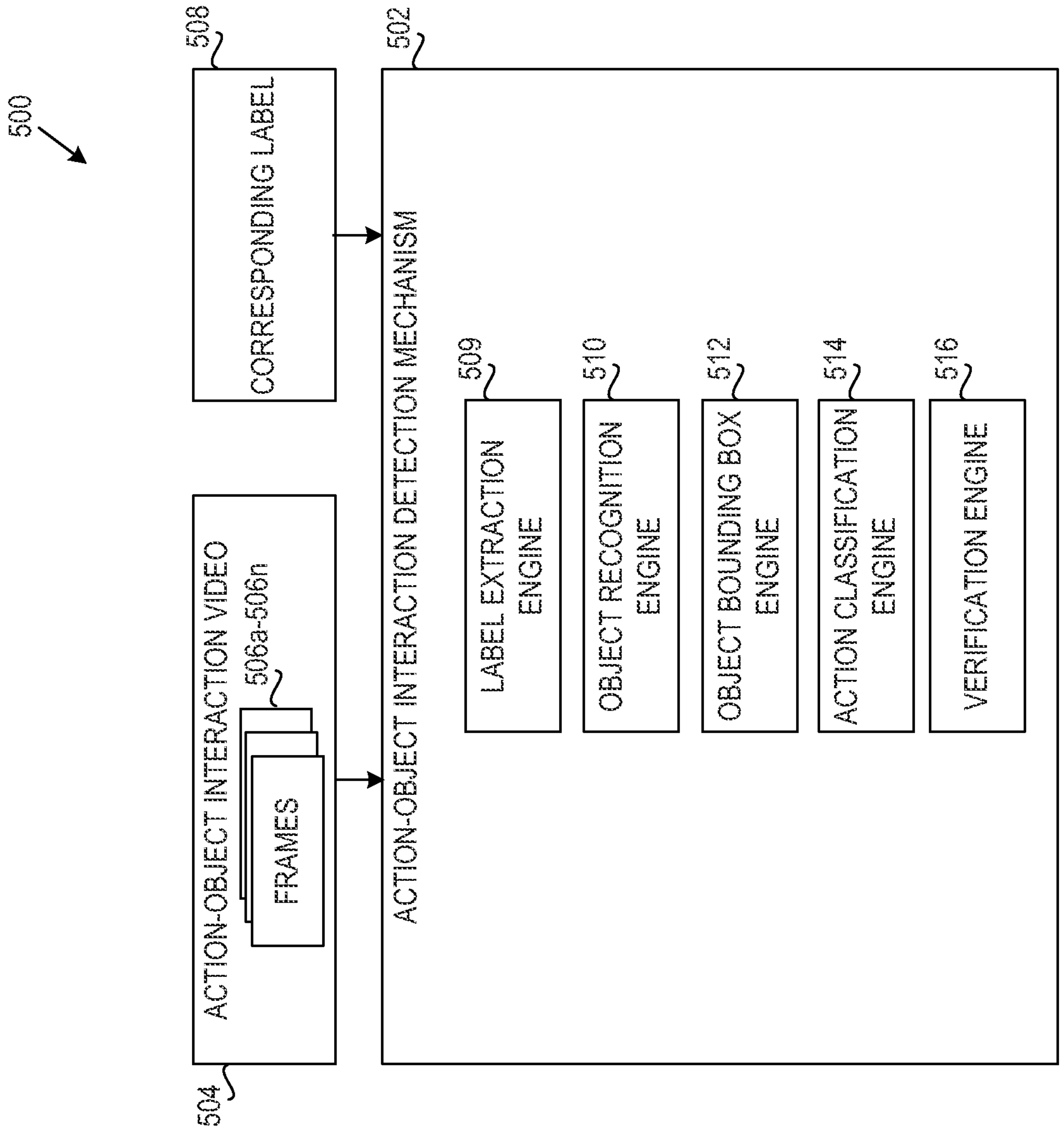
FIG. 5 depicts one example of a functional block diagram of action-object interaction detection mechanism for recognizing actions in cluttered video scenes by leveraging existing datasets in accordance with an illustrative embodiment.

For each video, Bounding Box Object (BBO) identifier 314 identifies the BBOs in the frames of the video. A BBO is a cropped area of the frame where the cropped area of the frame is determined to contain a given object. BBO identifier 314 uses the object specified by the frame's object label as the given object. FIG. 5 describes one example of how the bounding box object (BBO) for each frame is generated. In an embodiment using the example illustrated in FIG. 5, the object of interest is given by the frame's object label, the BBO for a frame is selected to be the area inside the frame's refined bounding box, bounding box propagation from the initial best frame is done to frames both preceding and succeeding the best initial frame in the video and a BBO is be determined to exist in a frame if the frame has a refined bounding box. BBO identifier 314 identifies at most one BBO per frame. For a video with n frames, where n is a number such as 100, 200, etc., BBO identifier 314 will identify n or fewer than n BBOs. Each BBO is a cropped area of a frame and is labeled with the frame's the object, verb and VGV labels. BBO pruner 316 prunes and retains only a subset of BBOs in order to insert the best BBOs into the object dataset. Such a subset (referred to as a "pruned BBO subset" or "pruned BBO set" or "pruned set of BBOs" which contains "pruned BBOs") may be obtained by identifying the BBOs that capture significant changes in the state of the object, for example by using information theoretic methods, template matching techniques or keyframe extraction methods. A pruned BBO subset may also be obtained by using techniques that use image features such as texture, motion, etc. to capture dissimilarity in the content of the BBOs. In an embodiment, pairs of BBOs are scored for dissimilarity and BBOs are selected as pruned BBOs based on those scores. Examples of scores that are measures of dissimilarity between a pair of BBOs are those based on the amount of reconstruction error between the pair of BBOs or variance between the pair of BBOs. In an embodiment BBO selection based on these scores is done in an iterative manner. For example, the first BBO (BBO_1) is selected as a reference BBO and is compared pairwise with all subsequent BBOs: BBO_2, BBO_3, BBO_4, BBO_5, BBO_6, where BBOs are indexed by order of the occurrence of their corresponding frames in the video. In this example, a high dissimilarity scores indicate a high degree of dissimilarity. Each pairwise comparison results in a dissimilarity score. For example, the dissimilarity score between BBO_1 and BBO_2 is, say, s12, the dissimilarity score between BBO_1 and BBO_3 is, say, s13 and the dissimilarity score between BBO_1 and BBO_4 is, say, s14. Adjacent frames will likely have a low dissimilarity score.

Continuing with the example, at the start of the iteration, the pruned set of BBOs is initialized to an empty set. Each of the dissimilarity scores is compared to a threshold. If the dissimilarity score is less than a threshold, then the non-reference BBO from the pair corresponding to the dissimilarity score is dropped from further rounds of comparison. The reference BBO is marked as processed and added to the set of pruned BBOs. For example, if s13, s12 are below the threshold and s14, s15 and s16 are equal to or above the threshold, BBO_2, BBO_3 are dropped from further rounds of comparison. BBO_4, BBO_5, BBO_6 are retained for further rounds of comparison. BBO_1 is marked as processed and added to the set of pruned BBOs. In the next iteration, the retained, unprocessed BBO with the lowest index becomes the reference BBO. In the example, BBO_4 becomes the reference BBO and is compared with BBO_5, BBO_6. Each pairwise comparison again results in a dissimilarity score and non-reference BBOs corresponding to dissimilarity scores below the threshold are dropped. For example, the dissimilarity score between BBO_4 and BBO_5 is, say, s45, the dissimilarity score between BBO_4 and BBO_6 is, say, s46. If the dissimilarity score for a BBO pair is less than a threshold, then the non-reference BBO is dropped from further rounds of comparison. For example, if s45 is below the threshold and s46 equal to or above the threshold, BBO_5 is dropped from further rounds of comparison. BBO_4 is marked as processed and added to the set of pruned BBOs. In the next iteration, BBO_6 becomes the reference BBO. However, there are no additional non-reference BBOs to compare against BBO_6 because the other BBOs have either been dropped from further comparison or have been added to the pruned BBO set. BBO_6 is then added to the pruned BBO set. In an embodiment the dissimilarity scoring is symmetric, i.e., a pair of BBOs have the same dissimilarity score independent of which is considered the reference. In an embodiment, the threshold for measuring dissimilarity is a pre-determined numeric value. In an embodiment, when all dissimilarity scores for all non-reference BBOs are below the threshold, only the reference BBO is added to the pruned BBO step and the pruned BBO selection process stops. For example, the first BBO (BBO_1) is selected as the reference BBO and is compared pairwise with all subsequent BBOs: BBO_2, BB_3, BBO_4, BBO_5, BBO_6 resulting in dissimilarity scores s12, s13, s14, s15, s16 respectively. If all of the dissimilarity scores s12, s13, s14, s15, s16 are below the threshold, then BBO_2, BB_3, BBO_4, BBO_5, BBO_6 are dropped from further comparison and BBO_1 is added to the pruned BBO set and the process stops. Pruning the set of BBOs leads to a smaller and more diverse set. The BBOs in the pruned BBO set are hereafter also referred to as sufficiently distinct BBOs.

The next step is to determine if a BBO from the set of BBOs identified after the BBO pruning step is a strong candidate for addition into the object dataset. Scoring engine 318 begins such a determination by computing an information addition score for each BBO retained during the BBO pruning step.

In an embodiment, a comparison-dataset-based information addition score for a BBO (call it the target BBO) is determined by comparing the target BBO to BBOs in a comparison dataset. The comparison dataset to which the target BBO is compared is the OVG-CD that corresponds to the BBO's object and verb subgroup. The BBO's object is given by its object label and the BBO's verb subgroup is given by its VGV label. Note that a comparison dataset for each combination of object and verb subgroup is initialized by VerbGroup label generator 308. BBOs are added to the appropriate comparison datasets by dataset modifier 322 as videos are processed. The information addition score indicates how different the target BBO is from the BBOs in the comparison dataset. An example measure that may be used to calculate the information score is based on mutual information. In an embodiment, the comparison-dataset-based information addition score for the target BBO may be, for example, based on the highest pairwise mutual information score (where a high mutual information score reflects low diversity) of the target BBO with the BBOs in the BBO's comparison dataset. Such a mutual information based score may be transformed mathematically such that a low value of the highest pairwise mutual information score for the target BBO results in a high comparison-dataset-based score for the target BBO. In another embodiment, the number of pairwise mutual information scores between the target BBO and the BBOs in the BBO's comparison dataset below a threshold, say C, is determined (where again a high mutual information score reflects low diversity). The comparison-dataset-based information addition score is expressed as the ratio of the number of pairwise mutual information scores below C to the number of BBOs in the target BBO's comparison dataset. In an embodiment the value of a comparison-dataset-based information addition score exceeding a predefined threshold is used to determine if a target BBO adds significant information or diversity to the object dataset. The threshold for a mutual-information-based comparison-dataset-based information addition score is tunable and may be adjusted to create object datasets with variable numbers of BBOs per object class, depending on the use case, such as for transfer learning or few shot learning, i.e., transfer learning using very few training samples. In some embodiments there are also tunable parameters within the information score calculations (such as C, above) that may be adjusted to create object datasets with variable numbers of BBOs per object class, depending on the use case.

Comparison datasets differ in different embodiments, for example, based on whether or not verbs are considered when creating comparison datasets and, if so, whether or not similarity-based verb subgrouping is performed. Embodiments that create more granular comparison datasets reduce the computational burden for comparisons. In an embodiment where verbs are considered when creating comparison datasets and similarity-based subgrouping is performed, for example, if the set of input videos have labels "cut bag", "stow bag", 'close bag', "carry bag" and 'close drawer', and the OVGL for 'bag' is [['cut'], ['stow', 'carry'], ['close']] then a BBO from a video with object label 'bag' and VGV label: ['close'] will be compared against other BBOs processed so far with object label 'bag' and VGV label ['close']. Specifically, this BBO will not be compared against BBOs processed so far with object label 'bag' and VGV labels ['cut'], or ['stow', 'carry']. Furthermore, this BBO will not be compared against BBOs with VGV label ['close'] that have object labels other than 'bag' such as 'drawer'. Note that in an embodiment, comparison datasets may be created without considering verbs, as described above. In that case, a BBO is compared against BBOs processed so far with the same object label. Comparison datasets get updated as video processing progresses.

Another example of an information addition score is a pre-trained classifier-based information addition score which is based on the output of a pre-trained object classifier. The terms 'pre-trained object classifier' and 'pre-trained classifier' are used interchangeably hereafter. Note that if the 'object' label corresponding to the BBO is not present as an output class label of the pre-trained classifier, then a mapping from the 'object' label corresponding to the BBO to one or more of the output class labels of the pre-trained classifier may be determined, for example, using an available lexical database, and utilized; or pre-trained classifier-based information addition scoring may be skipped or not used for assessment for the BBO. In an example embodiment, each BBO may be input to a pre-trained object classifier such as a CNN based object classifier. For a given object, a pre-trained classifier outputs the probability of the object being present in its image input. Evaluation engine 320 uses the pre-trained classifier to output such a probability for the object corresponding to the BBO's object label. Evaluation engine 320 uses this probability to calculate the information addition score for the input BBO. For example, the information addition score may be set equal to the one minus the probability. A pre-trained classifier is used to identify under-represented BBO's in the existing dataset on which the pre-trained classifier was trained. A low output probability and therefore, a high information addition score implies under-representation in the pre-trained classifier's training dataset. Adding an under-represented BBO is desirable.

The information addition score for a BBO may be, for example, a list that includes both a comparison-dataset-based information addition score and a pre-trained-classifier-based information addition score or a calculation based on both a comparison-dataset-based information addition score and a pre-trained-classifier-based information addition score, such as a normalized average of the comparison-dataset-based information addition score and the pre-trained-classifier-based information addition score.

Evaluation engine 320 performs a BBO assessment. The BBO is assessed for addition to both an object dataset 324 and, for some embodiments, a comparison dataset. In an embodiment evaluation engine 320 performs a BBO assessment one BBO at a time. In another embodiment evaluation engine 320 performs a BBO assessment by considering the group of pruned BBOs for a video together. If evaluation engine 320 performs its evaluation one BBO at a time, the assessment may be a comparison of the information addition score to a predefined threshold. For example, if the information addition score is a comparison-dataset-based information addition score, the information addition score is compared to a pre-defined comparison-dataset-based information addition score threshold. As another example, if the information addition score is a pre-trained-classifier-based information addition score, the information addition score is compared to a pre-trained-classifier-based information addition score threshold. As yet another example, if the information addition score is a normalized average of a comparison-dataset-based information addition score and a pre-trained-classifier-based information addition score, the normalized average information addition score is compared to a normalized average information addition score threshold. In these cases, a positive assessment is made if the information addition score exceeds the threshold score to which it is compared. As yet another example, if the information addition score is a list that includes both a comparison-dataset-based information addition score and a pre-trained-classifier-based information addition score, the predefined threshold may be a list with a value for the comparison-dataset-based information addition score and a value for the pre-trained-classifier-based information addition score. In that case, determining whether or not the score exceeds the threshold may be done various ways, for example, the score may be determined to exceed the threshold if each of the elements of the score list exceeds the each of the corresponding elements of the threshold list. Alternatively, the score may be determined to exceed the threshold if at least one element of the score list exceeds the corresponding element of the threshold list, the score may be determined to exceed the threshold if a normalized average of the two information addition scores exceeds the normalized average of the two thresholds, etc. The score exceeding the threshold results in a positive assessment.

If evaluation engine 320 performs its evaluation using the group of BBOs for a video together, evaluation engine 320 may assess the BBOs for the given video for object dataset addition relative to one another, instead of or in addition to comparing the information addition score to a predefined threshold. For example, if BBO pruner 316 selects two BBOs for a video, evaluation engine may first compare the information addition scores of each of the pruned BBOs to a predefined threshold as described herein and then, if both exceed the threshold, assign a positive assessment to the BBO with the higher of the two information addition scores (and a negative assessment to the other BBO). Comparison of information scores for two BBOs may be done various ways. For example, if the information addition score is a comparison-dataset-based information addition score, the BBO with the higher information score may be determined as the one with the higher comparison-dataset-based information addition score. If the information addition score is a pre-trained-classifier-based information addition score, the BBO with the higher information score may be determined as the one with the higher pre-trained classifier-based information addition score. If the information addition score is a normalized average of a comparison-dataset-based information addition score and a pre-trained-classifier-based information addition score, then the BBO with the higher information score may be determined as the one with the higher normalized average information addition score. As another example, if the information addition score is a list that includes both a comparison-dataset-based information addition score and a pre-trained-classifier-based information addition score, the BBO with the higher information score may be determined, for example, as the one with a higher normalized average of the two information addition scores, or as another example the one with the higher comparison-dataset-based information addition score, or as another example the one with the higher pre-trained-classifier-based information addition score, etc.

When, evaluation engine 320 performs its evaluation using the group of BBOs for a video together by assessing the BBOs for the given video for object dataset addition relative to one another, instead of or in addition to comparing the information addition score to a predefined threshold, in some embodiments, it determines the m highest-scoring BBOs. Determining the in highest-scoring BBOs may be accomplished by ranking the BBOs for example based on pairwise comparisons as described herein and choosing the in most highly-ranked BBOs. m may be a pre-defined number, such as 1, 2, 3, etc. or may be, for example, a number that varies based on characteristics of the set of pruned BBOs associated with the video, e.g., in could be equal to one half of the number of pruned BBOs rounded to a whole number, or for an example where the information addition score for a BBO is a single value (such as a normalized average of a comparison-dataset-based information addition score and a pre-trained-classifier-based information addition score for the BBO), in could be a number of BBOs belonging to a group of BBOs that have information addition scores within a top quartile of information addition scores. Evaluation engine 320 may compare the information addition scores of each of the determined in most highly-ranked pruned BBOs to a predefined threshold as described herein and give a positive assessment to the p most highly-ranked pruned BBOs whose information addition scores also exceed the predefined threshold, where p<=m. Note that comparison of the information addition scores of pruned BBOs to a predefined threshold may be done before identifying the set of most highly-ranked BBOs and in that case limiting the ranking operation to only pruned BBOs whose information addition scores exceed a predefined threshold, e.g., to save ranking computation. Alternatively, evaluation engine 320 may give a positive assessment to the in most highly-ranked pruned BBOs without comparing to a predefined threshold.

Based on the evaluation performed by evaluation engine 320, dataset modifier 322 adds BBOs with positive assessment for dataset addition to object dataset 324. In one embodiment, dataset modifier 322 adds the BBOs to a transfer learning object dataset with label "object", e.g., with label "box". The transfer learning dataset contains categories corresponding to the objects extracted by the label parsing engine 306. In another embodiment, dataset modifier 322 adds the BBOs to an existing object dataset in an "object" category, e.g., in "box" category. Based on the evaluation performed by evaluation engine 320, dataset modifier 322 optionally adds BBOs with positive assessment to a comparison dataset so as to optionally facilitate a next round of comparison-dataset-based information addition scoring. The comparison dataset to which the BBOs are added is determined by the BBO labels. Recall that that a comparison dataset for each combination of object and verb subgroup is created by VerbGroup Label Generator Engine 308. The BBO's object label and VGV label are used to identify the BBO's corresponding OVG-CD, which is the comparison dataset to which the BBOs with positive assessment are added.

In another embodiment, dataset modifier 322 adds BBOs from a video to a new compliance object dataset that comprises a number of state categories for all or a subset of object-verb combinations present in the video labels. A motivation for creating state categories for an object-verb combination is to produce categories that each correspond to the object in a given state, where differences in states from one state category to another result from the object being acted upon by the action denoted by the verb. A set of state categories for an object could optionally be used to replace the object's dataset category in an existing dataset where the existing dataset contains only a single category for the object. The new compliance object dataset could also be used for transfer learning, or if it is large enough as a stand-alone dataset to train a neural network, e.g., one that is initialized randomly. In an embodiment, the number of state categories for each object-verb combination for which state categories are being created is pre-selected to be two and the state categories represent a starting state and an ending state. For a given video, dataset modifier 322 adds the first of the pruned BBOs output by BBO pruning engine 316, i.e., the pruned BBO whose corresponding frame appears earliest in the video, to the state category that represents the starting state; and dataset modifier 322 adds the last of the pruned BBOs output by BBO pruning engine 316, i.e., the pruned BBO whose corresponding frame appears latest in the video, to the state category that represents the ending state. For example, for object "box" and verb "close" state categories are created corresponding to a box that has not been closed (an open box) and a box that has been closed (a closed box). The first state category is labeled "box_close_0" and the final state category is labeled "box_close_1." In another embodiment the number of state categories for each object-verb combination for which state categories are being created is pre-selected to be three and the state categories represent a starting state, an ending state, and an in-between state. For a given video, dataset modifier 322 adds the first of the pruned BBOs output by BBO pruning engine 316, i.e., the pruned BBO whose corresponding frame appears earliest in the video, to the state category that represents the starting state; dataset modifier 322 adds the last of the pruned BBOs output by BBO pruning engine 316, i.e., the pruned BBO whose corresponding frame appears latest in the video, to the state category that represents the ending state and dataset modifier 322 adds the pruned BBO output by BBO pruning engine 316 that is closest to the middle of the set of pruned BBOs to the state category that represents the in-between state. The pruned BBO closest to the middle of the set of pruned BBOs is identified, for example, by numbering the frames corresponding to the pruned BBO set 1 to n in order of occurrence in the video, and choosing as the pruned BBO closest to the middle of the set of pruned BBOs the one corresponding to the frame with index n/2, rounded to a whole number. The first state category is labeled "box_close_0", the final state category is labeled "box_close_1", and the in-between state category is labeled "box_close_0.5." Another way to choose the BBO for the in-between state category would be to choose the BBO between the first BBO and last BBO that is most dissimilar from the first BBO, most dissimilar to the last BBO, etc. In another embodiment, the number of state categories for each object-verb combination for which state categories are being created is pre-selected to be one and the state category represents a single state such as an ending state. In the example of an ending state, for a given video, dataset modifier 322 adds the last of the pruned BBOs output by BBO pruning engine 316, i.e., the pruned BBO whose corresponding frame appears latest in the video, to the state category that represents the ending state. For example, for object "box" and verb "close" a state category is created corresponding to a box that has been closed (a closed box), where the state category is labeled "box_close_1." When the number of state categories to be created for an object-verb combination is one and there are fewer than two pruned BBOs in the set of pruned BBOs output by BBO pruning engine 316 for a video with object and verb labels corresponding to the object-verb combination, adding a pruned BBO to a state category may be skipped for the video. For embodiments that perform optional compliance dataset creation, the set of labeled action-object videos 302 may be limited to videos that show the action occurring a single time and where the action is fully performed. In an embodiment, different numbers of state categories can be selected for different object-verb combinations. An example of how to do the selection is by applying action-object interaction detection mechanism 304 to a set of input videos, noting the size of the pruned BBO sets for videos corresponding to each object-verb combination present in the video labels and selecting a number of state categories for each object-verb combination based on the average size of the pruned BBO set for the object-verb combination across the set of videos, where larger numbers of state categories are selected for object-verb combinations with larger average pruned BBO sets. The number of categories could be one, two, three, etc. In general, when the number of state categories is greater than one, the state categories for each object-verb combination for which state categories are being created include a starting state, an ending state and a number of states in between equal to the number of state categories being created for the object-verb combination minus two. If the pruned BBO set output by BBO pruning engine 316 contains fewer pruned BBOs than the number of state categories to be created for each object-verb combination for which state categories are being created, in an embodiment, no BBOs from the video are added to the new compliance object dataset.

Dataset modifier 322 optionally replaces the category in an existing dataset corresponding to each object that has a category created for it in the new compliance object dataset with the new compliance object dataset state categories corresponding to the object. In other words, optionally the category corresponding to the object in the existing dataset is removed and the new state categories corresponding to the object are added.

In an embodiment, a subset of object-verb combinations is chosen for creation of new compliance object dataset categories. An example of how the object-verb combinations are chosen is by using a lexical database to identify state-change verbs, such as 'open', 'close', 'fill', 'empty' and 'cut' and choosing object-verb combinations including those verbs. Another example is by applying the action-object interaction detection mechanism 304 to a set of input videos to produce a transfer learning object dataset where the transfer learning object dataset contains categories corresponding to the objects extracted by the label parsing engine 306, and then using a pre-trained object classifier to get a score for each BBO in the transfer learning object dataset and choosing object-verb combinations present in the set of video labels corresponding to object categories in the transfer learning object dataset that have low scores, where a low score indicates a low confidence from the pre-trained classifier that its input BBO contains the object corresponding to the BBO's label. Note that if the 'object' label corresponding to the BBO is not present as an output class label of the pre-trained classifier, then a mapping from the 'object' label corresponding to the BBO to one or more of the output class labels of the pre-trained classifier may be determined, for example, using an available lexical database, and utilized; or pre-trained classifier-based scoring may be skipped or not used to determine object-verb combinations corresponding to the 'object' label. Another example is similar to the previous one, but in this case the action-object interaction detection mechanism 304 maintains object and verb labels associated with each BBO when it produces a transfer learning object dataset, uses a pre-trained object classifier to get a score for each BBO in the transfer learning object dataset and chooses as object-verb combinations for creation of new dataset categories object-verb combinations whose associated BBOs (i.e., BBOs having object and verb labels corresponding to the object-verb combination) have low scores output by the pre-trained object classifier for the BBO's object class, where a low score indicates a low confidence from the pre-trained classifier that its input BBO contains the object. Low pre-trained object classifier scores in these examples indicate a shortcoming in the dataset on which the pre-trained classifier is trained, where the shortcoming could be a result of under-representation of objects in different states for objects achieving the low scores. Under-representation of objects in different states causing poor classification scores for an object may indicate that the verbs corresponding to the chosen object-verb combinations are state-change verbs for the object and in turn that creation of a new compliance object dataset category for the object-verb combination would be beneficial. Similarly, action-object interaction detection mechanism 304 can be applied to a set of input videos to create or modify an object dataset and comparison-dataset-based information addition and/or pre-trained classifier-based information addition scores may be noted and object-verb combinations across the set of videos where high scores are attained (i.e., where BBOs being assessed add significant diversity) may be chosen for creation of new compliance object dataset categories or sizes of pruned BBO sets may be noted and object-verb combinations across the set of videos corresponding to large pruned BBO set sizes may be chosen for creation of new compliance object dataset categories. Optionally a combination of methods can be applied.

Note that as described above, in an embodiment, opposite verbs are identified and videos corresponding to one of the opposite verbs are reversed before video processing. In that case, the verb label may be a compound of the opposite verbs. The compliance dataset creation procedures above can be applied maintaining the video reversal as described earlier and utilizing the compound verbs in verb labels and operations based on verb labels.

The above description assumes BBOs are assessed for addition to the object dataset by scoring engine 318 and evaluation engine 320 incrementally with either a decision made on each BBO one at a time or with a decision made on the BBOs for a video at once. Assuming instead there is a set of videos and a dataset addition may be made using the whole set of videos, then the previously described procedure may be modified such that the information addition scores maybe computed and evaluated considering groups of pruned BBOs across all videos, where groups may include pruned BBOs from videos, for example, with the same object label or the same object-VGV label. For example, information addition scores may be based on pre-trained classifier scores. Pruned BBOs in a given group from all videos may be input to a pre-trained classifier and the set of pruned BBOs producing a certain range of information addition scores may be the BBOs chosen for object dataset addition for the object associated with the group. For example, a distribution of information addition scores across pruned BBOs with a given object label may be obtained and BBOs with information addition scores (determined for example as one minus the classification confidence for the object's category) in the highest quartile may be selected for dataset addition in that object category. In this example, a high pre-trained-classifier-based information addition score corresponds to a low score for the object's class output by the pre-trained classifier, which in turn indicates under-representation in the pre-trained classifier's training dataset. As another example, comparison-dataset-based information addition scores may be determined for each BBO in a group of pruned BBOs across the set of videos by removing a target BBO and calculating a value measuring how different the target BBO is from all other pruned BBOs in the group, such as a value based on mutual information. A pairwise mutual information based score may be calculated for the target BBO paired with each BBO in the remaining group, where a low pairwise mutual information based score indicates large dissimilarity between the BBOs. Such a calculation may be repeated using each BBO as the target. A target BBO's comparison-dataset-based information addition score could be, for example, the number of other BBOs that have a pairwise mutual information based score with the target BBO less than a predefined threshold. In this example, a high comparison-dataset-based information addition score corresponds to the target BBO's having a large number of low pairwise mutual information based scores, where the target BBO's low pairwise mutual information based scores in turn indicate a large dissimilarity between the target BBOs and the other pruned BBOs in the group. The BBOs with the highest comparison-dataset-based information addition scores across the group of BBOs may be selected for object dataset addition in the appropriate object category. A combination of pre-trained classifier-based and comparison-dataset based information addition scores may also be used.

As would be understood by one of ordinary skill in the art, synonyms may be combined, e.g., 'close' and 'shut' or 'car' and 'automobile.'

Figure 4:
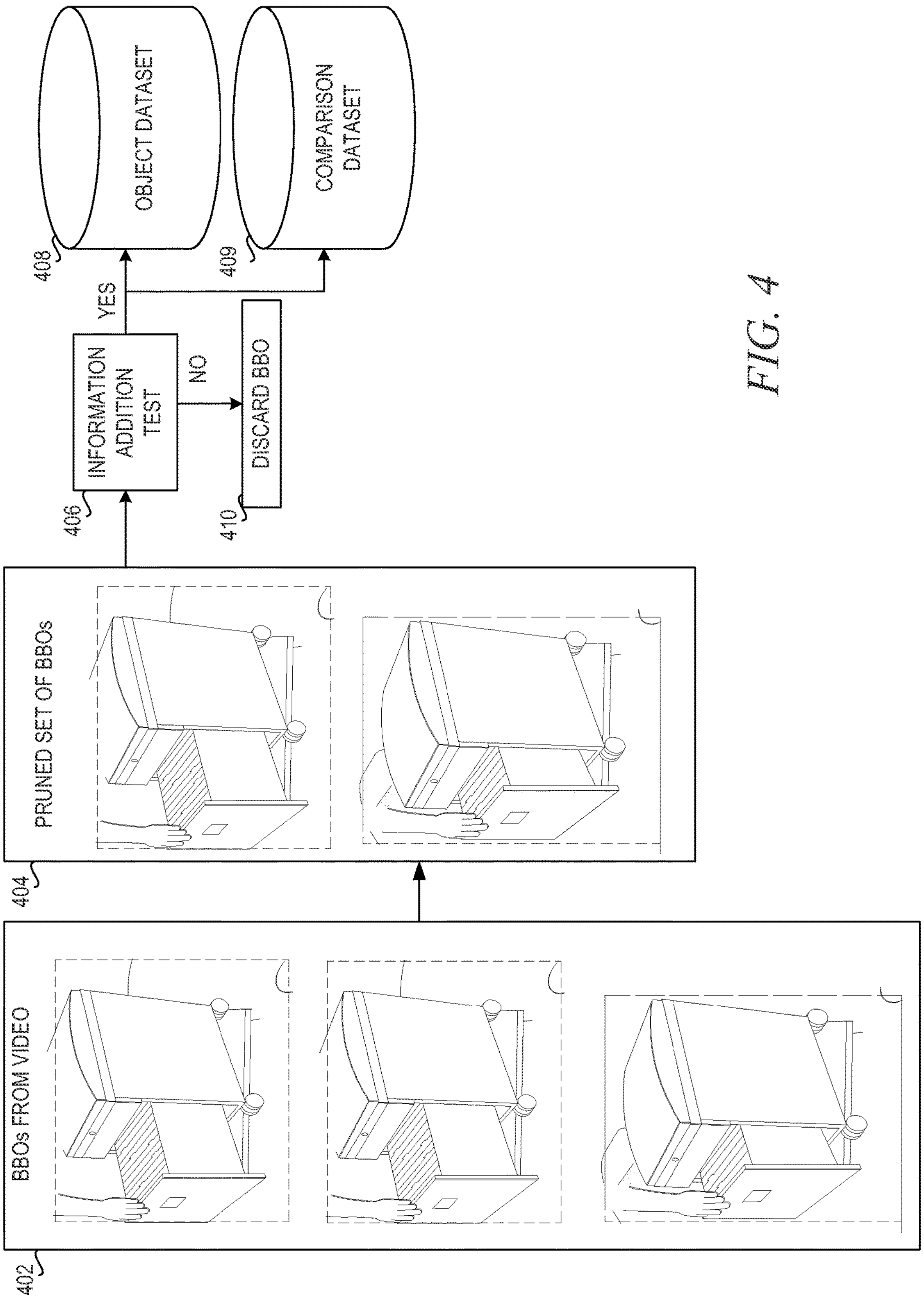
FIG. 4 depicts an exemplary process of an object dataset creation or modification mechanism, such as object dataset creation or modification mechanism 304 of FIG. 3, creating an object dataset using the labels associated with the videos in accordance with an illustrative embodiment.

FIG. 4 depicts an exemplary process of an object dataset creation or modification mechanism, such as object dataset creation or modification mechanism 304 of FIG. 3, creating an object dataset using the labels associated with the videos in accordance with an illustrative embodiment. Initially, bounding Box Object (BBO) identifier 314 identifies a set of bounding boxes 402, at most one BBO per frame in a video. BBO pruner 316 then prunes the identified BBOs 404 to identify sufficiently distinct BBOs. For each pruned BBO, scoring engine 318 determines an information addition score and, in box 406, evaluation engine 320 then performs an evaluation either one BBO at a time or using the group of BBOs from the video together. In one embodiment, evaluation engine 320 performs a BBO assessment by comparing an information addition score, such as a comparison-dataset-based information addition score or a pre-trained-classifier-based information addition score or both to a predefined threshold. If evaluation engine 320 determines that the information addition score is above the predefined threshold, the pruned BBO is added to the object dataset 408 and to comparison dataset 409, if using. If evaluation engine 320 determines that the information addition score is equal to or below the predefined threshold, the pruned BBO is discarded 410.

FIG. 5 depicts one example of a functional block diagram of action-object interaction detection mechanism for recognizing actions in cluttered video scenes by leveraging existing datasets in accordance with an illustrative embodiment. Data processing system 500 comprises action-object interaction detection mechanism 502 which receives as input action-object interaction video 504, comprising one or more frames **506*a*-506*n* and corresponding label 508 associated with action-object interaction video 504. Action-object interaction detection mechanism 502 is to output a determination as to whether or not the action taking place in action-object interaction video 504 matches the action in the corresponding label 508. Action-object interaction detection mechanism 502 comprises label extraction engine 509, object recognition engine 510, object bounding box engine 512, action classification engine 514, and verification engine 516**.

For action-object interaction video 504 with one or more frames **506*a*-506*n* and corresponding label 508, such as "open drawer," "close drawer," "open microwave," "close refrigerator," or the like, label extraction engine 509 utilizes natural language processing to initially extract from corresponding label 508, the object of interest such as "drawer," "microwave," "refrigerator," or the like, as well as the action that is to be verified, such as "open" "close" or the like. Optionally, label extraction engine 509 then identifies a set of related objects. The need for identifying related objects is motivated by the fact that the vocabulary of objects used in the text label may be different from the set of object class labels associated with the image dataset on which the pre-trained object classifier utilized by object recognition engine 510 and object bounding box engine 512 is trained. ImageNet® is a common dataset used for pre-training object classifiers. In order to use object classification models that have been pre-trained on ImageNet® and the corresponding object class labels, object recognition engine 510 must first obtain a mapping from the object of interest extracted from the corresponding label 508 to one or more of the object class labels available in ImageNet®. For example, a commonly used ImageNet® dataset does not have an object class label corresponding to the object "drawer." For such objects, object recognition engine 510 finds related objects, for example, using an available lexical database such as WordNet®, which contains an ontology including synonyms and related objects for objects. In the example where the object is "drawer," referencing a lexical database would provide a set of related objects such as "filing cabinet." From this set of related objects, object recognition engine 510 retains the ones that are present in ImageNet®. If the dataset on which the pre-trained object classifier is trained contains the object of interest extracted from corresponding label 508 among its object class labels, the identification of a set of related objects may optionally be skipped. The object of interest extracted from the corresponding label 508 will hereafter be referred to as the object of interest or OoI. Object recognition engine 510 forms a set containing the OoI with the optional addition of or substitution with its set of related objects, where the members of the set are present among the object class labels associated with the dataset on which the pre-trained object classifier utilized by object recognition engine 510 and object bounding box engine 512** is trained. The formed set will hereafter be referred to as the classifier OoI set. In accordance with the illustrative embodiments, an unseen object is an object where there are insufficient views of the object in one or more rich datasets, such as ImageNet®, leading to incorrect prediction by robust pre-trained object models. Such unseen object views typically arise from state changes of an object during the course of an action, such as the states of the "filing cabinet" during an "open" action. In accordance with the illustrative embodiments, an unseen action-object interaction is an interaction where there are insufficient examples of the action being performed on an object.

As would be understood by one skilled in the art, an object classifier commonly outputs a probability indicating object presence for each object class on which it is trained. Similarly, using known techniques, a heatmap may be computed that highlights the pixels that are responsible for the identification of each object for which the object classifier outputs a probability. It is possible that the classifier OoI set has cardinality greater than one. Throughout this description, where a probability that the OoI appears in a video frame or a region in the frame is determined, that probability is determined as the maximum probability over the probabilities associated with the one or more objects in the classifier OoI set. Similarly, when a heatmap is created that identifies the pixels responsible for the identification of the OoI in a video frame or a region in the frame, the object class corresponding to the maximum probability over the probabilities associated with the one or more objects in the classifier OoI set is used to compute the heatmap. The terms ‘region in a or the frame’ and ‘frame region’ are used interchangeably.

Utilizing the OoI, object recognition engine 510 processes the frames from action-object interaction video 504 and determines if OoI is present in the one or more frames 506*a*-506*n*. Specifically, for each extracted frame, object recognition engine 510 computes a probability that the OoI appears in the frame, for example, using an existing object classifier trained on a dataset such as ImageNet®. Object recognition engine 510 selects the best frame as the one with the highest probability less than a predetermined selection value. Object bounding box engine 512 uses the best frame identified in 510 as the best initial frame. For the best initial frame, the object bounding box engine 512 creates a heatmap that highlights the pixels that are responsible for identification of the OoI. Such heatmaps may be computed using techniques such as, for example, the GradCam approach. Object bounding box engine 512 then identifies pixels that exceed a heatmap threshold (indicating high importance for identification of the OoI). Object bounding box engine 512 fits a rectangular contour encompassing the identified pixels. The rectangular contour is the bounding box for the OoI in the best initial frame.

Then, for each subsequent frame of the one or more frames 506*a*-506*n* following the identified best initial frame, object bounding box engine 512 propagates the bounding box from the current frame to the subsequent frame. This propagation is done using known techniques such as, for example, Generic Object Tracking Using Regression Networks (GOTURN). GOTURN is a neural network based tracker which takes as input a frame, the location of a rectangular bounding box surrounding an area of interest within this frame and a subsequent (target) frame and predicts the location of a bounding box surrounding the same area of interest within the subsequent (target) frame. Thus, GOTURN provides a mechanism to track the area around the object from frame to frame, as long as a pre-trained object classifier correctly classifies the OoI in at least one frame of the video. An alternative would be to propagate the bounding box from the current frame to the subsequent frame using known computer vision techniques for object tracking.

The initial bounding box in each frame obtained this way is not a tight bounding box, but instead contains some context around the object. Note that the initial bounding box for frames subsequent to the best initial frame may be a modified version of the bounding box output by the tool used for bounding box propagation, e.g., the bounding box may be expanded or shrunk by a given percentage. Context refinement is applied to each frame with a bounding box determined during the best initial frame's bounding box determination or during bounding box propagation. Context refinement is an iterative procedure. Given a video frame, on each context refinement iteration, the object bounding box engine 512 starts with the bounding box determined so far to define a frame region. Such a frame region may be obtained for example, by cropping the video frame to include only the area enclosed by the bounding box. The frame region obtained in this way is then input to an existing trained object classifier (trained on a dataset such as ImageNet®) to compute a probability that the OoI appears in the frame region. Object bounding box engine 512 creates a heatmap that highlights the pixels that are responsible for identification of the OoI. Such heatmaps may be computed using techniques such as, for example, the GradCam approach. Object bounding box engine 512 then identifies pixels that exceed a heatmap threshold (indicating high importance for identification of the OoI). Object bounding box engine 512 fits a rectangular contour encompassing the identified pixels. Object bounding box engine 512 uses the rectangular contour to define a new bounding box, which is considered to be the bounding box for the current iteration. In an embodiment, the new bounding box is the rectangular contour itself. In an alternative embodiment, the new bounding box may be larger than the starting bounding box for the iteration, e.g., if the rectangular contour extends to the edges of the frame region input to the object classifier. The new bounding box then includes pixels that lie within the original video frame but outside the frame region input to the object classifier. At the end of each iteration, the new bounding box becomes the bounding box determined so far for the next iteration.

The object bounding box engine 512 iteratively refines the bounding box coordinates by jointly optimizing a cost function that measures change, such as a decrease, increase, or the like, in the size of the current iteration's object bounding box compared to the previous bounding box and a cost function that measures the confidence associated with the prediction that the OoI appears in the current iteration's bounding box. One example of the measure of confidence in the prediction could be entropy. Jointly optimizing the two cost functions may be carried out, for example, by optimizing a weighted sum of the two cost functions. The iterative refinement stops when a stopping criterion is met, for example, when the combined cost function reaches a predefined value, when the combined cost function stops improving sufficiently, or the like. The context refinement procedure returns a refined bounding box, e.g., the final bounding box or the bounding box giving the best value of the combined cost function over the iterations. This context refinement procedure results in a bounding box that includes a useful amount of context around the object as opposed to a tight bounding box. Object bounding box engine 512 then crops every frame with a refined bounding box to include only the part of the frame within the refined bounding box, which produces the cropped video frame. In an embodiment, the cropped video frames are placed in the order they appeared in the original video to create a cropped video.

In another embodiment, instead of propagating the bounding box from the best initial frame to subsequent frames (one pair at a time) and then applying context refinement to the best initial frame and each of the bounding boxes that result from the propagation, context refinement and subsequent bounding box propagation are performed one after the other on a pair of frames at a time. Specifically, context refinement is done on the best initial frame's heatmap-based bounding box. Then the resulting refined bounding box is propagated to the subsequent frame, for example, using a known technique such as GOTURN. The propagated bounding box is then refined using context refinement and that refined bounding box is propagated to the next frame, and so on.

Note that in either embodiment, the frames “subsequent to” the best initial frame may be those that succeed the best initial frame in the order of the frames in the video, those that precede the best initial frame in the order of the frames in the video (i.e., “subsequent” is defined in reverse video order) or both. The illustrative embodiments use “next”, “subsequent” and “following” interchangeably. Frames that do not have refined bounding boxes because the context refinement procedure fails to return a bounding box (e.g., because it fails to identify any bounding box with an acceptably high-confidence prediction that the OoI appears within the bounding box) are dropped. In other words, they are not included in the set of cropped frames that are sent to the action classification engine 514.

The action classification engine 514 processes the cropped video using a pre-trained action classifier, for example, an action classifier trained on an existing dataset, such as Moments in Time. A set of action classifiers rather than a single one may be used. In an embodiment, the action classifier or classifiers outputs the probability that the action being performed in the video is a given action, where the given actions correspond to the various action classes present in the training dataset such as "open", "close" or the like. Verification engine 516 then determines whether the probability associated with the action that is to be verified, such as "open" "close" or the like, from the corresponding label 508 is equal to or exceeds a verification threshold. Responsive to verification engine 516 determining that the probability associated with the action that is to be verified from the corresponding label 508 is equal to or exceeds the verification threshold, verification engine 516 provides a confirmation that the action-object interaction video 504 performs the action that is to be verified. In the alternative, responsive to verification engine 516 determining that the probability associated with the action that is to be verified from the corresponding label 508 is below the verification threshold, verification engine 516 provides a notification that the action-object interaction video 504 fails to perform the action that is to be verified. In either instance, the verification engine 516 may also provide a probability that the action-object interaction video 504 does or does not perform the action that is to be verified. The verification threshold may be, for example, a predefined value or a predefined value adjusted based on the standard deviation of the probabilities output by the action classifier or the set of action classifiers corresponding to the action classes present in the training dataset, or the like.

Note that it may be possible for the probability associated with one or more actions in addition to the one to be verified also to be equal to or exceed the verification threshold. Ensuring the labels present in the action classifier's training dataset do not contain synonyms is good practice to avoid that situation. If it does happen, it would be possible to maintain the policy above or modify it to, for example, provide a confirmation that the action-object interaction video 504 performs the action that is to be verified from the corresponding label 508 only if the probability associated with the action that is to be verified from the corresponding label 508 is highest among the probabilities associated with all of the actions in the action classifier's training dataset. This could be implemented, for example, by setting the probabilities for all but the highest class to zero.

Figure 6A:
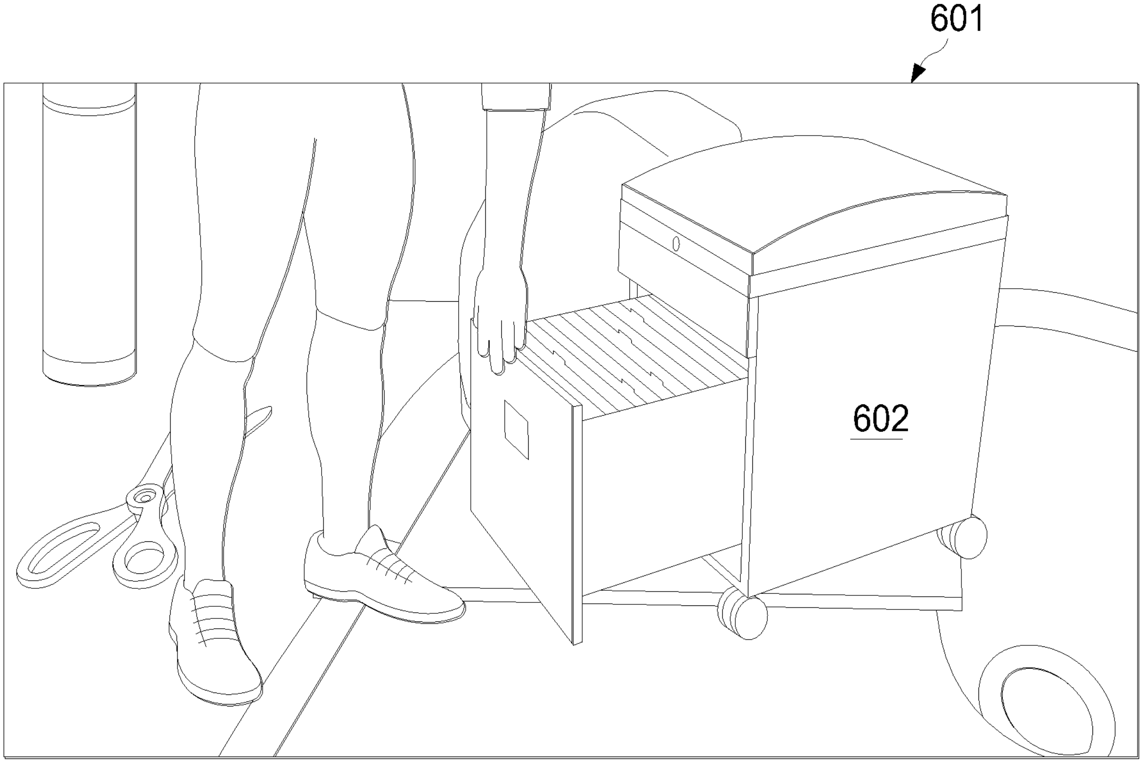
FIGS. 6A-6D depicts an exemplary process of an action-object interaction detection mechanism recognizing actions in cluttered video scenes by leveraging existing datasets in accordance with an illustrative embodiment.

FIGS. 6A-6D depict an exemplary process of an action-object interaction detection mechanism, such as action-object interaction detection mechanism 502 of FIG. 5, recognizing actions in cluttered video scenes by leveraging existing datasets in accordance with an illustrative embodiment. The action-object interaction video consists of frames that capture the action of a person closing a drawer. The input label associated with this video is "close drawer." The label extraction engine 509 determines the OoI as "drawer", the classifier OoI set as "filing cabinet" and the action to be verified as "close". In FIG. 6A, the action-object interaction detection mechanism identifies a best initial frame 601 from the action-object interaction video that includes OoI 602 with the highest probability less than a predetermined selection value. With best initial frame 601 identified, in FIG. 6B the action-object interaction detection mechanism computes a heatmap of the OoI 602 within best first frame 601 that highlights the pixels that are responsible for identification of the OoI. Such heatmaps may be computed using techniques such as, for example, the GradCam approach. Pixels are identified that exceed a heatmap threshold (indicating high importance for identification of the OoI). Object bounding box engine 512 fits a rectangular contour encompassing the identified pixels. The rectangular contour defines bounding box 606 around the OoI 602.

The context refinement procedure refines the bounding box 604 to produce the refined bounding box 604*a* for the OoI 602. That is, the action-object interaction detection mechanism iteratively refines the bounding box coordinates by jointly optimizing a cost function that measures change, such as a decrease, increase, or the like, in the size of the current iteration's object bounding box compared to the previous bounding box and a cost function that measures the confidence associated with the prediction that the OoI appears in the current iteration's bounding box. One example of the measure of confidence in the prediction could be entropy. Jointly optimizing the two cost functions may be carried out, for example, by optimizing a weighted sum of the two cost functions. The iterative refinement stops when a stopping criterion is met, for example, when the combined cost function reaches a predefined value, when the combined cost function stops improving sufficiently, or the like. The context refinement procedure returns a refined bounding box, e.g., the final bounding box or the bounding box giving the best value of the combined cost function over the iterations. This context refinement procedure results in a bounding box that includes a useful amount of context around the object as opposed to a tight bounding box.

Figure 6B:
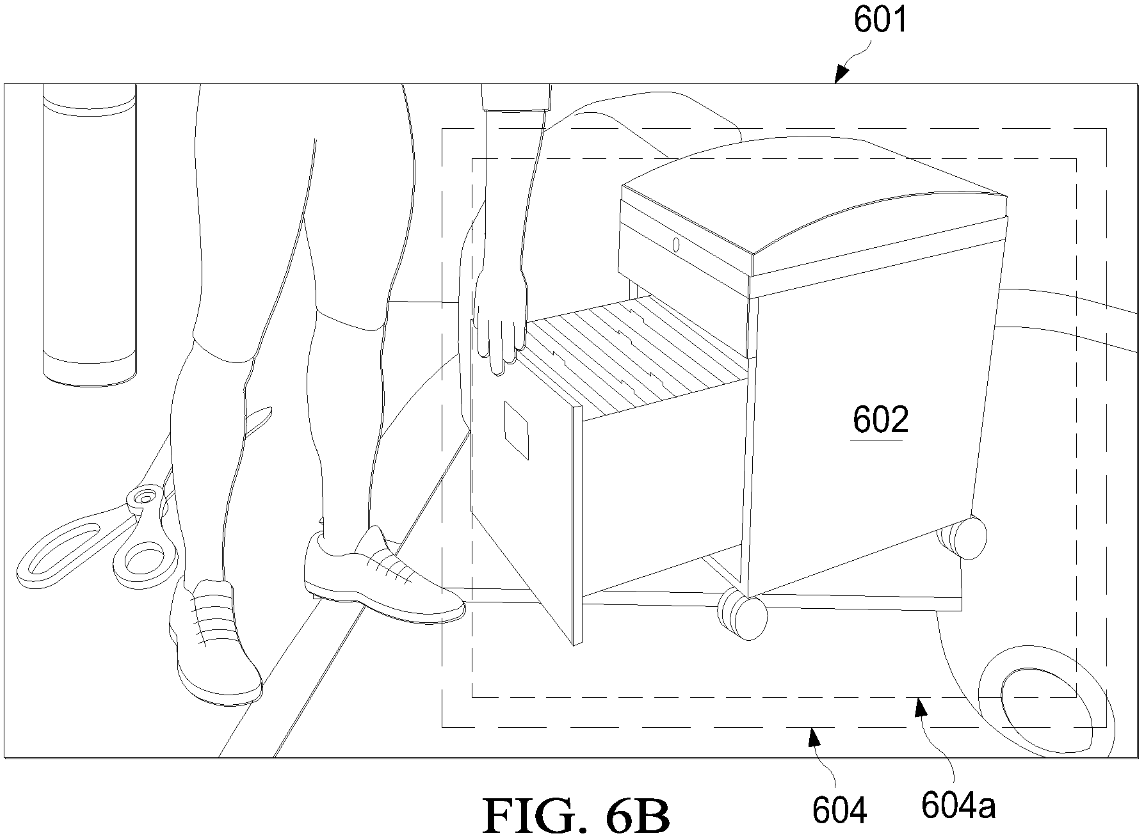
Figure 6C:
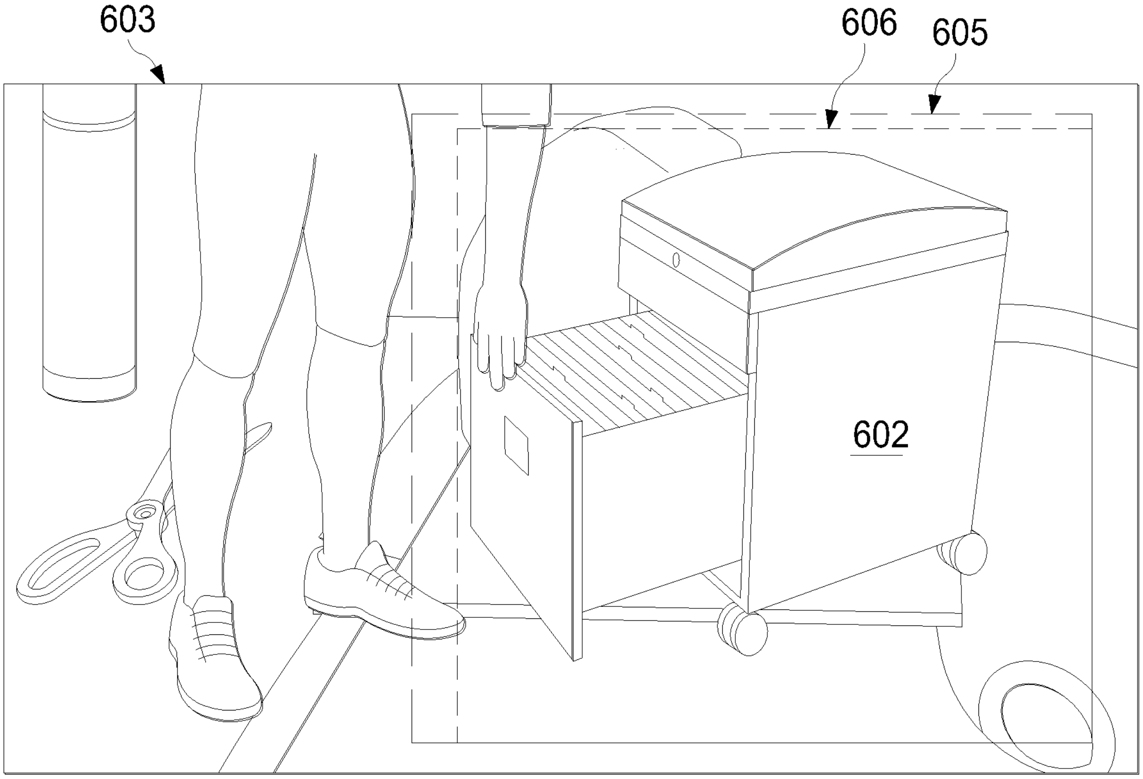

In FIG. 6C, the action-object interaction detection mechanism propagates the bounding box 604 from best initial frame 601 in FIG. 6B to frame 603 in FIG. 6C as the propagated bounding box 605. The context refinement procedure refines the bounding box 605 to produce the refined bounding box 606 for the OoI 602. That is, the action-object interaction detection mechanism iteratively refines the bounding box coordinates by jointly optimizing a cost function that measures change, such as a decrease, increase, or the like, in the size of the current iteration's object bounding box compared to the previous bounding box and a cost function that measures the confidence associated with the prediction that the OoI appears in the current iteration's bounding box. One example of the measure of confidence in the prediction could be entropy. Jointly optimizing the two cost functions may be carried out, for example, by optimizing a weighted sum of the two cost functions. The iterative refinement stops when a stopping criterion is met, for example, when the combined cost function reaches a predefined value, when the combined cost function stops improving sufficiently, or the like. The context refinement procedure returns a refined bounding box, e.g., the final bounding box or the bounding box giving the best value of the combined cost function over the iterations. This context refinement procedure results in a bounding box that includes a useful amount of context around the object as opposed to a tight bounding box.

Figure 6D:
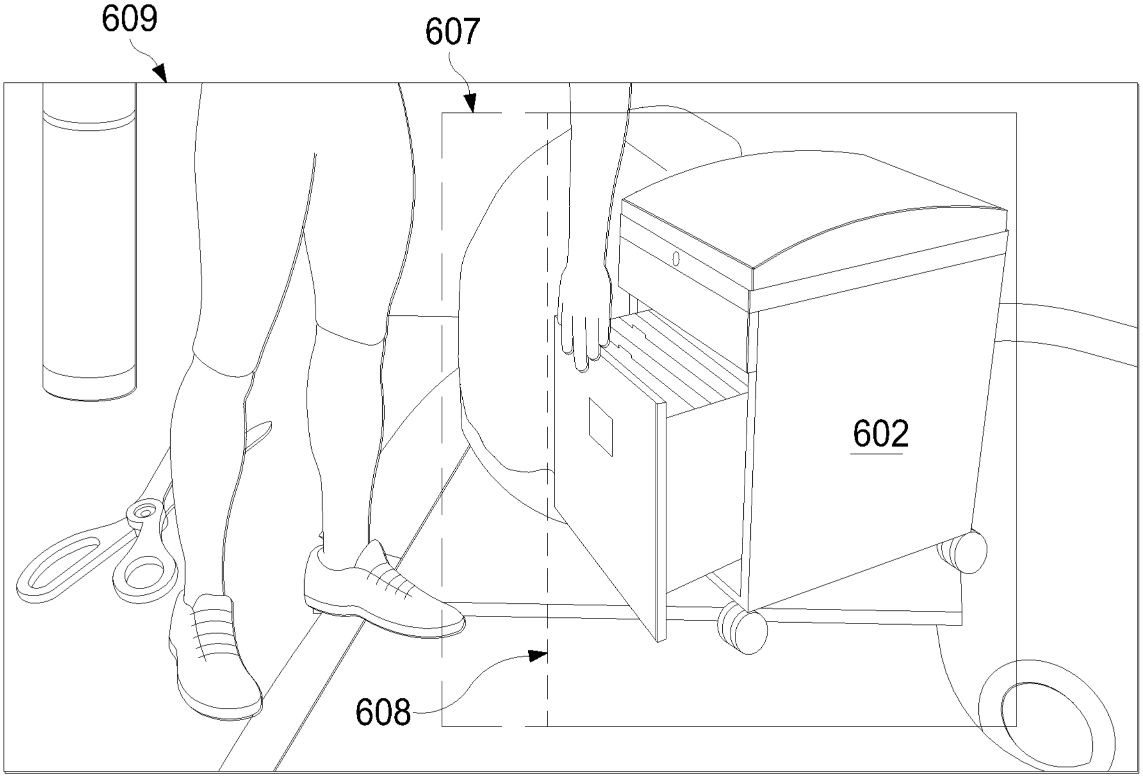

In FIG. 6D, the action-object interaction detection mechanism propagates the bounding box 605 from the frame in FIG. 6C to the frame in FIG. 6D to obtain the bounding box 607 in FIG. 6D. The context refinement procedure refines the bounding box 607 to produce the bounding box 608 for the OoI 602. That is, the action-object interaction detection mechanism iteratively refines the bounding box coordinates by jointly optimizing a cost function that measures change, such as a decrease, increase, or the like, in the size of the current iteration's object bounding box compared to the previous bounding box and a cost function that measures the confidence associated with the prediction that the OoI appears in the current iteration's bounding box. One example of the measure of confidence in the prediction could be entropy. Jointly optimizing the two cost functions may be carried out, for example, by optimizing a weighted sum of the two cost functions. The iterative refinement stops when a stopping criterion is met, for example, when the combined cost function reaches a predefined value, when the combined cost function stops improving sufficiently, or the like. The context refinement procedure returns a refined bounding box, e.g., the final bounding box or the bounding box giving the best value of the combined cost function over the iterations. This context refinement procedure results in a bounding box that includes a useful amount of context around the object as opposed to a tight bounding box.

The object bounding box engine 512 then crops the frames with refined bounding boxes 604*a*, 606, and 608 to include only the part of the frames within the refined bounding boxes, which produces the cropped video frames. In an embodiment the cropped video frames are placed in the order they appeared in the original video to create a cropped video. The action classification engine 514 processes the cropped video using a pre-trained action classifier, for example, an action classifier trained on an existing dataset, such as Moments in Time. A set of action classifiers rather than a single one may be used. The action classification engine then assigns a probability score to the action classes, including the action class "close" and since the probability score for the action class "close" is equal to or exceeds than the verification threshold, the action is verified as "close" using the verification engine 516.

The present invention may be a system, a method, and/or a computer program product. The computer program product may include a computer readable storage medium (or media) having computer readable program instructions thereon for causing a processor to carry out aspects of the present invention.

The computer readable storage medium may be a tangible device that may retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Figure 7:
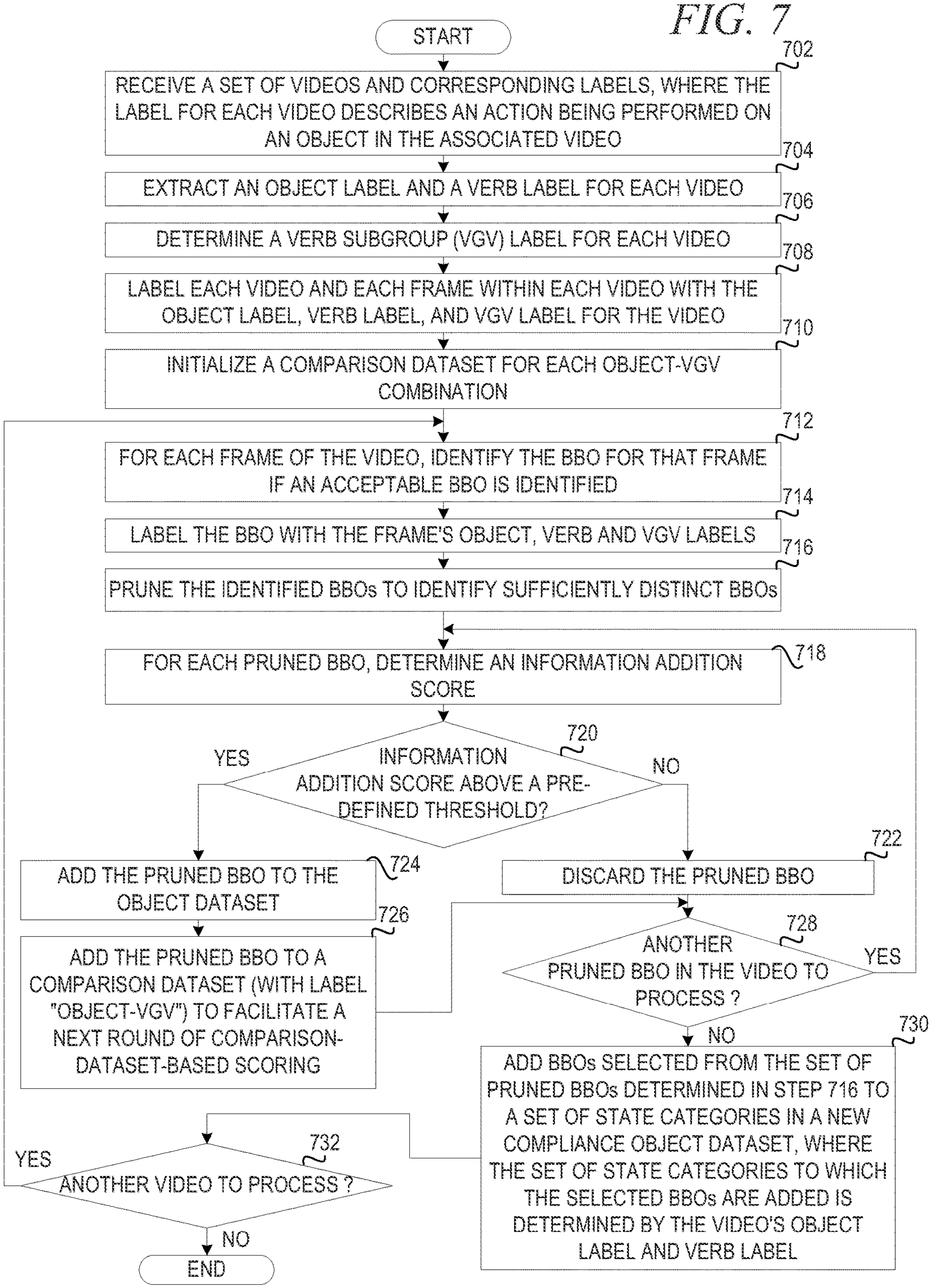
FIG. 7 depicts an exemplary flowchart of the operation performed by an object dataset creation or modification mechanism in creating or modifying an object dataset in accordance with an illustrative embodiment.

FIG. 7 depicts an exemplary flowchart of the operation performed by an object dataset creation or modification mechanism in creating or modifying an object dataset in accordance with an illustrative embodiment. As the operation begins, the object dataset creation or modification mechanism receives a set of videos and corresponding labels, where the label for each video describes an action being performed on an object in the associated video (step 702). The object dataset creation or modification mechanism extracts an object label and a verb label for each video (step 704) and determines a verb subgroup (VGV) label for each video (step 406). The object dataset creation or modification mechanism labels each video and each frame within each video with the object label, verb label, and VGV label for the video (step 708) and initializes a comparison dataset for each object-VGV combination (step 710). For each frame of the video, the object dataset creation or modification mechanism identifies the BBO for that frame if an acceptable BBO is identified (step 712) and the object dataset creation or modification mechanism labels the BBO with the frame's object, verb, and VGV labels (step 714). The object dataset creation or modification mechanism prunes the identified BBOs to identify sufficiently distinct BBOs (step 716).

For each pruned BBO, the object dataset creation or modification mechanism determines an information addition score (step 718). That is, the object dataset creation or modification mechanism optionally computes a comparison-dataset-based information addition score, for example based on mutual information. A high comparison-dataset-based information addition score indicates the pruned BBO adds significant information, i.e. the pruned BBO adds diversity to the object dataset, which is desirable. The object dataset creation or modification mechanism optionally or instead computes a pre-trained-classifier-based information addition score. That is, the object dataset creation or modification mechanism optionally inputs the pruned BBO into a pre-trained classifier to identify under-represented images in the object dataset on which the pre-trained classifier was trained. A high pre-trained-classifier-based information addition score indicates a low score for the object's class output by the classifier, which in turn indicates under-representation in the pre-trained classifier's training dataset. Adding under-represented images is desirable.

With the information addition score determined, the object dataset creation or modification mechanism then performs an evaluation either one BBO at a time or using the group of BBOs from the video together. FIG. 7 illustrates this operation being performed one BBO at a time. The object dataset creation or modification mechanism performs a BBO assessment by comparing an information addition score to a predefined threshold (step 720). If at step 720 the object dataset creation or modification mechanism determines that the information addition score is equal to or below the predefined threshold, the object dataset creation or modification mechanism discards the pruned BBO (step 722). If at step 720 the object dataset creation or modification mechanism determines that the information addition score is above the predefined threshold, the object dataset creation or modification mechanism adds the pruned BBO to the object dataset (step 724). In an embodiment, based on the evaluation performed by the object dataset creation or modification mechanism, when adding BBOs with positive assessment to an object dataset, the object dataset creation or modification mechanism adds the pruned BBO to a transfer learning object dataset with label "object", e.g., with label "box." In an embodiment, based on the evaluation performed by the object dataset creation or modification mechanism, the object dataset creation or modification mechanism also adds pruned BBOs with positive assessment to a comparison dataset (with label "object-VGV") to facilitate a next round of comparison-dataset-based scoring (step 726). From steps 726 and 722, the object dataset creation or modification mechanism determines whether there is another pruned BBO in the video to process (step 728). If at step 728 there is another pruned BBO to process, the operation returns to step 718. If at step 728 there is not another pruned BBO in the video to process, in an (optional) embodiment, the object dataset creation or modification mechanism adds BBOs selected from the set of pruned BBOs determined in step 716 to a set of state categories in a new compliance object dataset, where the set of state categories to which the selected BBOs are added is determined by the video's object label and verb label (step 730). In an embodiment, only a subset of object-verb combinations are chosen for state category creation. If the object-verb combination corresponding to the video's object and verb labels is not chosen for state category creation or if the number of pruned BBOs determined in step 716 for the video is less than the number of pruned BBOs needed for state category creation for the object-verb combination corresponding to the video's object and verb labels, no BBOs are added to a new compliance dataset in step 730 for the video. The object dataset creation or modification mechanism then determines whether there is another video to process (step 732). If at step 732 there is another video to process, the operation returns to step 712. If at step 732 there is not another video to process, the operation ends.

Figure 8:
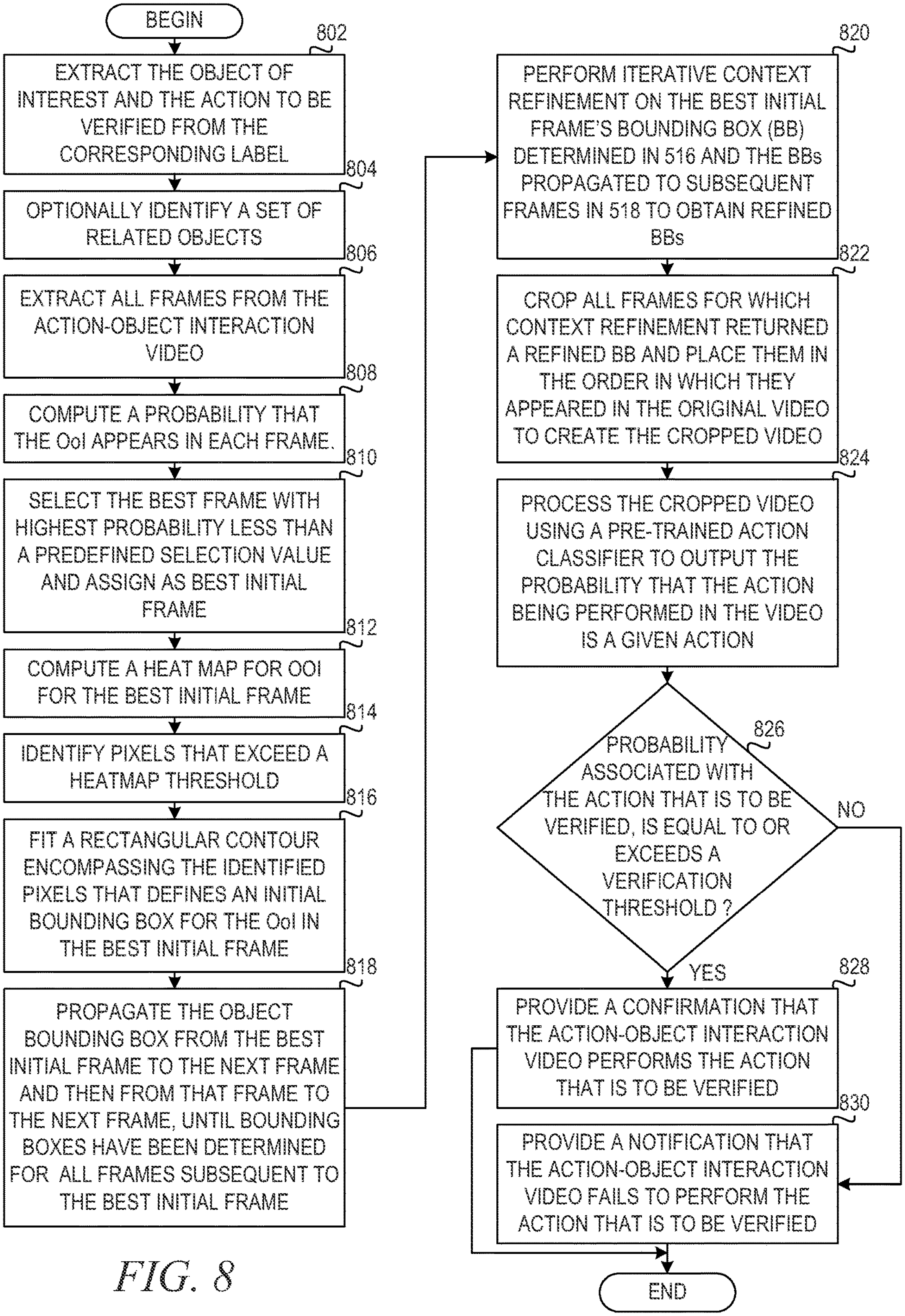
FIG. 8 depicts an exemplary flowchart of the operation performed by an action-object interaction detection mechanism in recognizing actions in cluttered video scenes by leveraging existing datasets in accordance with an illustrative embodiment.

FIG. 8 depicts an exemplary flowchart of the operation performed by an action-object interaction detection mechanism in recognizing actions in cluttered video scenes by leveraging existing datasets in accordance with an illustrative embodiment. As the operation begins, for an identified action-object interaction video with one or more frames and a corresponding label, such as "close filing cabinet," "open microwave," "close refrigerator," or the like, a label extraction engine of the action-object interaction detection mechanism extracts, from the corresponding label, the initial object of interest, such as "filing cabinet," "microwave," "refrigerator," or the like, as well as the action that is to be verified, such as "open", "close" or the like (step 802). Based on identifying the object of interest (OoI), the label extraction engine optionally identifies a set of related objects (step 804) and among the OoI and optionally the set of related objects, retains those present in the dataset on which the object classifier to be used in subsequent steps is trained, thereby forming a set of objects that comprise the classifier object of interest (OoI) set. In step 806, all the frames from the action-object interaction video are extracted. The object recognition engine then computes a probability that the OoI appears in each frame (step 808). The object recognition engine selects the best frame as the one with the highest probability less than a predetermined selection value and assigns that as the best initial frame (step 810).

For the best initial frame, the object recognition engine computes a heatmap (step 812) that highlights the pixels that are responsible for identification of the OoI. Such heatmaps may be computed using techniques such as, for example, the GradCam approach. The object recognition engine then identifies pixels that exceed a heatmap threshold (indicating high importance for identification of the OoI) (step 814). The object bounding box engine fits a rectangular contour encompassing the identified pixels, where the rectangular contour defines the initial bounding box for the OoI (step 816). The object bounding box engine then propagates the object bounding box from the best initial frame to the next frame and then from that frame to the next frame, until bounding boxes have been determined for all frames subsequent to the best initial frame (step 818). The object bound box engine then performs iterative context refinement (step 820) on the best initial frame's bounding box determined in step 816 and the bounding boxes propagated to subsequent frames in step 818 to obtain refined bounding boxes. Object bounding box engine then crops all frames for which context refinement returned a refined bounding box and places them in the order in which they appeared in the original video to create the cropped video (step 822)

Next, action-object interaction detection mechanism processes the cropped video using a pre-trained action classifier, i.e., an action classifier trained on an existing dataset, such as Moments in Time. A set of action classifiers, rather than a single one may be used. The action classifier or classifiers outputs the probability that the action being performed in the video is a given action, where the given actions correspond to the various action classes present in the training dataset such as "open", "close" or the like (step 824). The verification engine then determines whether the probability associated with the action that is to be verified, such as "open" "close" or the like, is equal to or exceeds a verification threshold (step 826). If at step 826 the verification engine determines that the probability associated with the action that is to be verified from the corresponding label is equal to or exceeds the verification threshold, the verification engine provides a confirmation that the action-object interaction video performs the action that is to be verified (step 828), with the process ending thereafter. If at step 826 the verification engine determines that the probability associated with the action that is to be verified from the corresponding label is below the verification threshold, the verification engine provides a notification that the action-object interaction video fails to perform the action that is to be verified (step 830), with the process ending thereafter. In either instance, the verification engine may also provide a probability that the action-object interaction video does or does not perform the action that is to be verified.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Thus, the illustrative embodiments provide mechanisms for creating a new object dataset or modifying an existing object dataset by including objects identified in a set of frames of a video in altered states. The mechanisms ensure training examples considered for inclusion in the object dataset are sufficiently different from examples already included. In addition, the illustrative embodiments provide mechanisms to create object dataset categories that are especially useful for problems such as action compliance verification. In such a scenario, the dataset has sets of separate state categories for objects, such as separate categories for "box that is open" versus "box that is closed."

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a communication bus, such as a system bus, for example. The memory elements can include local memory employed during actual execution of the program code, bulk storage, and cache memories which provide temporary storage of at least some program code in order to reduce the number of times code must be retrieved from bulk storage during execution. The memory may be of various types including, but not limited to, ROM, PROM, EPROM, EEPROM, DRAM, SRAM, Flash memory, solid state memory, and the like.

Input/output or I/O devices (including but not limited to keyboards, displays, pointing devices, etc.) can be coupled to the system either directly or through intervening wired or wireless I/O interfaces and/or controllers, or the like. I/O devices may take many different forms other than conventional keyboards, displays, pointing devices, and the like, such as for example communication devices coupled through wired or wireless connections including, but not limited to, smart phones, tablet computers, touch screen devices, voice recognition devices, and the like. Any known or later developed I/O device is intended to be within the scope of the illustrative embodiments.

Network adapters may also be coupled to the system to enable the data processing system to become coupled to other data processing systems or remote printers or storage devices through intervening private or public networks. Modems, cable modems and Ethernet cards are just a few of the currently available types of network adapters for wired communications. Wireless communication based network adapters may also be utilized including, but not limited to, 802.11 a/b/g/n wireless communication adapters, Bluetooth wireless adapters, and the like. Any known or later developed network adapters are intended to be within the spirit and scope of the present invention.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in a data processing system comprising at least one processor and at least one memory, wherein the at least one memory comprises instructions that are executed by the at least one processor to configure the at least one processor to implement an object dataset creation or modification mechanism for object dataset creation or modification using a labeled action-object video, the method comprising:

for a plurality of frames of the labeled action-object video, identifying a subset of frames where a bounding box object (BBO) exists;

pruning BBOs in the subset of frames where a BBO exists to identify sufficiently distinct BBOs thereby forming a set of pruned BBOs; and for each pruned BBO in the set of pruned BBOs:

determining an information addition score;

assessing the information addition score;

responsive to the information addition score being positively assessed, adding the pruned BBO to an object dataset; and responsive to the information addition score being negatively assessed, discarding the pruned BBO.

2. The method of claim 1, wherein the assessment of the information addition score is a comparison of the information addition score to a predefined threshold and wherein the method further comprises:

responsive to the information addition score being greater than the predefined threshold, adding the pruned BBO to the object dataset; and responsive to the information addition score being equal to or less than the predefined threshold, discarding the pruned BBO.

3. The method of claim 1, wherein the assessment of the information addition score is a comparison of information addition scores of the set of pruned BBOs to identify at least one first pruned BBO in the set of pruned BBOs with an information addition score greater than the information addition scores of a set of other pruned BBOs in the set of pruned BBOs and wherein, upon identifying the at least one first pruned BBO:

comparing the information addition scores of the set of pruned BBOs to a predefined threshold; and responsive to the information addition score of the at least one first pruned BBO being above the predefined threshold, adding the at least one first pruned BBO to the object dataset and discarding at least one second pruned BBO in the set of other pruned BBOs where an information score of the at least one second pruned BBO is above the predefined threshold.

4. The method of claim 1, further comprising:

identifying a set of labels associated with each frame of the plurality of frames in the labeled action-object video, wherein the set of labels associated with each frame of the plurality of frames in the labeled action-object video is determined based on a label of the labeled action-object video with which the frame is associated; and adding the set of labels identified associated with each frame to the pruned BBO associated with the frame.

5. The method of claim 4, wherein the set of labels comprises at least an object label and a verb label.

6. The method of claim 5, wherein the set of labels further comprises a verb subgroup (VGV) label.

7. The method of claim 1, further comprising:

adding the pruned BBO to a comparison dataset to facilitate a next round of comparison-dataset-based scoring.

8. The method of claim 1, further comprising:

adding a subset of pruned BBOs in the set of the pruned BBOs to a new compliance object dataset that has a set of state categories for the object associated with the subset of pruned BBOs.

9. The method of claim 1, wherein the information addition score is a comparison-dataset-based information addition score.

10. The method of claim 1, further comprising:

analyzing information addition scores associated with the set of pruned BBOs to determine a suitability of a combination of an object label and a verb label associated with the set of pruned BBOs for creating at least one new compliance object dataset category; and responsive to a positive assessment of the suitability of the combination of the object label and the verb label, creating the at least one new compliance object dataset category using the combination of the object label and the verb label.

11. A computer program product comprising a computer readable storage medium having a computer readable program stored therein, wherein the computer readable program, when executed on a computing device, causes the computing device to implement an object dataset creation or modification mechanism for object dataset creation or modification using a labeled action-object video and further causes the computing device to:

for a plurality of frames of the labeled action-object video, identify a subset of frames where a bounding box object (BBO) exists;

prune BBOs in the subset of frames where a BBO exists to identify sufficiently distinct BBOs thereby forming a set of pruned BBOs; and for each pruned BBO in the set of pruned BBOs:

determine an information addition score;

assess the information addition score;

responsive to the information addition score being positively assessed, add the pruned BBO to an object dataset; and responsive to the information addition score being negatively assessed, discard the pruned BBO.

12. The computer program product of claim 11, wherein the assessment of the information addition score is a comparison of the information addition score to a predefined threshold and wherein the computer readable program further causes the computing device to:

responsive to the information addition score being greater than the predefined threshold, add the pruned BBO to the object dataset; and responsive to the information addition score being equal to or less than the predefined threshold, discard the pruned BBO.

13. The computer program product of claim 11, wherein the assessment of the information addition score is a comparison of information addition scores of the set of pruned BBOs to identify at least one first pruned BBO in the set of pruned BBOs with an information addition score greater than the information addition scores of a set of other pruned BBOs in the set of pruned BBOs and wherein, upon identifying the at least one first pruned BBO, the computer readable program further causes the computing device to:

compare the information addition scores of the set of pruned BBOs to a predefined threshold; and responsive to the information addition score of the at least one first pruned BBO being above the predefined threshold, add the at least one first pruned BBO to the object dataset and discard at least one second pruned BBO in the set of other pruned BBOs where an information score of the at least one second pruned BBO is above the predefined threshold.

14. The computer program product of claim 11, wherein the computer readable program further causes the computing device to:

identify a set of labels associated with each frame of the plurality of frames in the labeled action-object video, wherein the set of labels associated with each frame of the plurality of frames in the labeled action-object video is determined based on a label of the labeled action-object video with which the frame is associated; and add the set of labels identified associated with each frame to the pruned BBO associated with the frame.

15. The computer program product of claim 14, wherein the set of labels comprises at least an object label, a verb label, and a verb subgroup (VGV) label.

16. The computer program product of claim 11, wherein the computer readable program further causes the computing device to:

add the pruned BBO to a comparison dataset to facilitate a next round of comparison-dataset-based scoring.

17. The computer program product of claim 11, further comprising:

adding a subset of pruned BBOs in the set of the pruned BBOs to a new compliance object dataset that has a set of state categories for the object associated with the subset of pruned BBOs.

18. The computer program product of claim 11, wherein the information addition score is a comparison-dataset-based information addition score.

19. The computer program product of claim 11, wherein the computer readable program further causes the computing device to:

analyze information addition scores associated with the set of pruned BBOs to determine a suitability of a combination of an object label and a verb label associated with the set of pruned BBOs for creating at least one new compliance object dataset category; and responsive to a positive assessment of the suitability of the combination of the object label and the verb label, create the at least one new compliance object dataset category using the combination of the object label and the verb label.

20. An apparatus comprising:

a processor, and a memory coupled to the processor, wherein the memory comprises instructions which, when executed by the processor, cause the processor to implement an object dataset creation or modification mechanism for object dataset creation or modification using a set of labeled action-object videos and further cause the processor to:

for a plurality of frames of the labeled action-object video, identify a subset of frames where a bounding box object (BBO) exists;

prune BBOs in the subset of frames where a BBO exists to identify sufficiently distinct BBOs thereby forming a set of pruned BBOs; and for each pruned BBO in the set of pruned BBOs:

determine an information addition score;

assess the information addition score;

responsive to the information addition score being positively assessed, add the pruned BBO to an object dataset; and responsive to the information addition score being negatively assessed, discard the pruned BBO.

* * * * *